US012777102B1

(12) United States Patent
Pecoraro et al.

(10) Patent No.: US 12,777,102 B1
(45) Date of Patent: Oct. 27, 2026

(54) SYSTEMS AND METHODS FOR VERIFIED UPGRADE VALIDATION OF EXECUTABLE CONTRACTS ON A DISTRIBUTED LEDGER PLATFORM

(71) Applicant: THE BANK OF NEW YORK MELLON, New York, NY (US)

(72) Inventors: James Pecoraro, New York, NY (US); Alexander Tuharsky, New York, NY (US); Jasper Williams, New York, NY (US)

(73) Assignee: THE BANK OF NEW YORK MELLON, New York, NY (US)

( * ) Notice: Subject to any disclaimer, the term of this patent is extended or adjusted under 35 U.S.C. 154(b) by 0 days.

(21) Appl. No.: 19/397,590

(22) Filed: Nov. 21, 2025

(51) Int. Cl.
*G06F 15/16* (2006.01)
*H04L 9/00* (2022.01)
*H04L 67/56* (2022.01)

(52) U.S. Cl.
CPC ................ *H04L 67/56* (2022.05); *H04L 9/50* (2022.05)

(58) Field of Classification Search
CPC ................................. H04L 67/56; H04L 9/50
USPC ......................................................... 709/203
See application file for complete search history.

(56) References Cited

U.S. PATENT DOCUMENTS 9,411,975 B2 * 8/2016 Smith .................... H04L 67/10
9,967,238 B1 5/2018 Hogan et al.
10,158,479 B2 12/2018 Chapman et al.
10,373,158 B1 8/2019 James et al.
10,740,808 B2 * 8/2020 Gray ...................... G06F 16/27
10,796,022 B2 10/2020 Dassenno
10,871,948 B1 12/2020 Dowling
10,873,456 B1 12/2020 Dods et al.
(Continued)

FOREIGN PATENT DOCUMENTS

CN 115511622 A 12/2022
CN 112118133 B 6/2023
(Continued)

OTHER PUBLICATIONS

Mouhamad Almakhour et al. "Verification of Smart Contracts: A Survey", Elsevier Jun. 27, 2020, (30 pgs.). https://www.sciencedirect.com/science/article/abs/pii/S1574119220300821.
(Continued)

*Primary Examiner* — Alicia Baturay
(74) *Attorney, Agent, or Firm* — Pillsbury Winthrop Shaw Pittman, LLP

(57) ABSTRACT

Techniques for validated upgrading of executable contracts including: receiving, by an upgrade validator, a request to upgrade a proxy contract stored on the distributed ledger to store a reference to an implementation contract stored on a distributed ledger, the implementation contract including executable implementation logic and implementation data; obtaining, by the upgrade validator, the implementation data for the implementation contract; determining, by the upgrade validator based on the implementation data for the implementation contract, that the implementation contract is compatible with the proxy contract; and upgrading, by the upgrade validator based on determining that the implementation contract is compatible with the proxy contract, the proxy contract to store the reference to the implementation contract in the proxy contract.

25 Claims, 8 Drawing Sheets

(56) References Cited

U.S. PATENT DOCUMENTS

| | | | | |
|---|---|---|---|---|
| 10,896,196 | B2 | 1/2021 | Sato et al. | |
| 10,922,441 | B2 * | 2/2021 | Mo | G06F 21/53 |
| 10,944,565 | B2 | 3/2021 | Bingham et al. | |
| 11,029,943 | B1 | 6/2021 | Delchev et al. | |
| 11,057,366 | B2 * | 7/2021 | Avetisov | H04L 67/141 |
| 11,088,826 | B2 | 8/2021 | Kandiraju et al. | |
| 11,169,985 | B2 | 11/2021 | Innocenti | |
| 11,188,384 | B2 | 11/2021 | Chan et al. | |
| 11,194,555 | B2 | 12/2021 | Narayanam et al. | |
| 11,195,180 | B2 | 12/2021 | Jiang et al. | |
| 11,205,178 | B2 | 12/2021 | Batra et al. | |
| 11,216,802 | B2 | 1/2022 | Overholser et al. | |
| 11,263,333 | B2 | 3/2022 | Youssef et al. | |
| 11,315,110 | B2 | 4/2022 | Jayachandran et al. | |
| 11,334,883 | B1 | 5/2022 | Auerbach et al. | |
| 11,360,946 | B2 | 6/2022 | Hintermeister et al. | |
| 11,372,817 | B2 | 6/2022 | Irazabal | |
| 11,397,944 | B2 | 7/2022 | Demarinis et al. | |
| 11,409,795 | B2 | 8/2022 | Zhou et al. | |
| 11,410,159 | B2 | 8/2022 | Wilson et al. | |
| 11,416,418 | B2 | 8/2022 | Sun et al. | |
| 11,429,738 | B2 | 8/2022 | Jayachandran | |
| 11,475,121 | B2 * | 10/2022 | Fujiwara | G06F 21/74 |
| 11,520,859 | B2 * | 12/2022 | Dewan | H04L 63/061 |
| 11,569,996 | B2 | 1/2023 | Saket et al. | |
| 11,582,040 | B2 | 2/2023 | Soundararajan et al. | |
| 11,599,858 | B2 | 3/2023 | Gaur et al. | |
| 11,625,783 | B1 * | 4/2023 | Gordon, III | G06Q 20/3678 705/37 |
| 11,637,708 | B2 * | 4/2023 | Hung | H04L 9/007 713/168 |
| 11,706,284 | B2 * | 7/2023 | Mikityuk | G06F 16/2255 709/203 |
| 11,769,156 | B2 | 9/2023 | Saket et al. | |
| 11,870,920 | B2 | 1/2024 | Ricotta et al. | |
| 11,874,827 | B2 | 1/2024 | Wood et al. | |
| 11,909,860 | B1 | 2/2024 | So | |
| 11,914,721 | B2 | 2/2024 | Rodler et al. | |
| 12,014,365 | B2 | 6/2024 | Throckmorton et al. | |
| 12,190,315 | B2 | 1/2025 | Kim | |
| 12,231,588 | B1 | 2/2025 | Dintchev et al. | |
| 12,271,898 | B1 | 4/2025 | Arvanaghi et al. | |
| 12,301,740 | B2 * | 5/2025 | Yan | H04L 9/3239 |
| 12,339,833 | B2 | 6/2025 | Chaudhry et al. | |
| 12,423,687 | B1 * | 9/2025 | Walbroehl | G06F 21/64 |
| 12,425,191 | B1 * | 9/2025 | Pecoraro | H04L 9/50 |
| 12,450,596 | B1 * | 10/2025 | Walbroehl | G06F 21/64 |
| 12,450,598 | B2 * | 10/2025 | Wen | H04L 9/3239 |
| 12,450,609 | B1 * | 10/2025 | Walbroeh | G06F 21/64 |
| 12,456,118 | B1 * | 10/2025 | Walbroehl | G06F 21/64 |
| 12,457,200 | B2 * | 10/2025 | Smith | H04L 63/0407 |
| 12,505,254 | B2 * | 12/2025 | Wen | G06F 21/64 |
| 12,537,671 | B2 * | 1/2026 | Davies | H04L 9/0836 |
| 12,537,694 | B1 * | 1/2026 | Pecoraro | H04L 9/3247 |
| 2016/0036826 | A1 * | 2/2016 | Pogorelik | G06F 21/10 726/1 |
| 2019/0034919 | A1 * | 1/2019 | Nolan | G06Q 20/36 |
| 2019/0319808 | A1 | 10/2019 | Fallah | |
| 2019/0333056 | A1 | 10/2019 | Wilkinson | |
| 2020/0119905 | A1 * | 4/2020 | Revankar | G06Q 20/06 |
| 2020/0175622 | A1 | 6/2020 | Lin et al. | |
| 2021/0173950 | A1 * | 6/2021 | Kwak | H04L 9/0643 |
| 2021/0357195 | A1 | 11/2021 | Zhu et al. | |
| 2022/0067728 | A1 | 3/2022 | Bellamy | |
| 2022/0207022 | A1 | 6/2022 | Wood | |
| 2022/0245589 | A1 * | 8/2022 | Akers | G06Q 10/063114 |
| 2022/0366486 | A1 * | 11/2022 | Mccoy | G06Q 30/08 |
| 2022/0383305 | A1 | 12/2022 | Smith | |
| 2023/0247106 | A1 | 8/2023 | Zeng | |
| 2023/0297983 | A1 * | 9/2023 | Zhu | G06Q 20/1235 705/67 |
| 2023/0318833 | A1 * | 10/2023 | Haber | G06Q 40/06 713/168 |
| 2024/0086915 | A1 | 3/2024 | Finlow-Bates | |
| 2024/0171548 | A1 | 5/2024 | Fallah | |
| 2024/0177147 | A1 | 5/2024 | Wen et al. | |
| 2024/0193684 | A1 | 6/2024 | Bai et al. | |
| 2024/0214229 | A1 | 6/2024 | Han | |
| 2024/0220964 | A1 * | 7/2024 | Doney | G06Q 20/40 |
| 2024/0265347 | A1 | 8/2024 | Matchett et al. | |
| 2024/0388453 | A1 * | 11/2024 | Zheng | H04L 63/18 |
| 2025/0053976 | A1 | 2/2025 | Zhu | |
| 2025/0070976 | A1 * | 2/2025 | Kavian | H04L 9/50 |
| 2025/0217793 | A1 * | 7/2025 | Pecoraro | G06Q 20/3829 |
| 2025/0260565 | A1 | 8/2025 | Abdelsamie | |
| 2025/0292248 | A1 | 9/2025 | Gilchrist | |
| 2025/0293882 | A1 | 9/2025 | Gilchrist | |

FOREIGN PATENT DOCUMENTS

| | | | |
|---|---|---|---|
| CN | 112269836 | B | 7/2023 |
| CN | 111399867 | A | 9/2023 |
| CN | 115098518 | B | 4/2024 |
| CN | 117951711 | A | 4/2024 |
| CN | 118074937 | A | 5/2024 |
| CN | 114201206 | B | 1/2025 |
| KR | 10-2024-0036472 | A | 3/2024 |
| WO | 2019/191216 | A1 | 10/2019 |
| WO | 2024/002468 | A1 | 1/2024 |
| WO | 2024/054665 | A1 | 3/2024 |

OTHER PUBLICATIONS

Ao Li et al., “Securing Smart Contract On The Fly”, (2019) 10.48550/arXiv.1911.12555, (14 pgs.).

Jing Liu et al., “A Survey on Security Verification of Blockchain Smart Contracts”, IEEE Access, vol. 7, 2019, pp. 77894-77904.

Silas Nzuva, “Smart Contracts Implementation. Applications, Benefits, and Limitations”, Journal of Information Engineering and Applications, vol. 9, No. 5, 2019, pp. 63-75.

Will Serrano, “Verification and Validation for data marketplaces via a blockchain and smart contracts”, Blockchain: Research and Applications 3 (2022) 100100 (18 pgs.).

Amritraj Singh et al., “Blockchain smart contracts formalization: Approaches and challenges to address vulnerabilities”, Computers and Security 88 (2020) 101654 (16 pgs.).

Mengya Zhang et al., “An Empirical Study of Proxy Contracts at the Ethereum Ecosystem Scale”, 2025, (13 pgs.).

Tao Li et al., “ATOM: Architectural Support and Optimization Mechanism for Smart Contract Fast Update and Execution in Blockchain-Based IoT”, IEEE Internet of Things Journal, vol. 9, No. 11, Jun. 1, 2022, pp. 7959-7971.

William E Bodell III et al., “Proxy Hunting: Understanding and Characterizing Proxy-based Upgradeable Smart Contracts in Blockchains”, USENIX Association, 32nd USENIX Security Symposium, Aug. 11, 2023, pp. 1829-1846.

Mehdi Salehi et al., “Not so immutable: Upgradeability of Smart Contracts on Ethereum”, Concordia University Jun. 1, 2022, Article arXiv.2206.00716, (31 pgs.).

Amir M. Ebrahimi et al., “A Large-Scale Exploratory Study on the Proxy Pattern in Ethereum”, Article arXiv.2501.00965, Jan. 1, 2025, (54 pgs.).

Openzeppelin Transparent Proxy Pattern, (8 pgs.). https://docs.openzeppelin.com/upgradesplugins/proxies.

* cited by examiner

SYSTEMS AND METHODS FOR VERIFIED UPGRADE VALIDATION OF EXECUTABLE CONTRACTS ON A DISTRIBUTED LEDGER PLATFORM

FIELD

Embodiments relate generally to distributed ledger technologies and, more particularly, to systems and methods for managing, validating, or upgrading proxy-based executable contracts on a blockchain network (e.g., smart contracts deployed on a blockchain network), including centralized administrative control, on-chain implementation validation, and verified upgrade compatibility among executable contract components.

BACKGROUND

Blockchain and other distributed ledger technologies enable execution of programmatic logic through executable contracts, such as smart contracts, that are deployed to, and executed within, decentralized computing environments. A smart contract may include executable logic that facilitates transactions, asset management, or other state transitions governed by consensus among participating network nodes.

In some blockchain architectures, a proxy pattern may be used to enable upgradeable smart contract functionality. A proxy contract may maintain persistent data storage while delegating execution of logic to a separate implementation contract that includes implementation logic. This arrangement can allow functionality of a deployed application to evolve over time without disrupting existing state data recorded on the distributed ledger.

Proxy-based architectures may further incorporate administrator or other control contracts that coordinate deployment, configuration, or upgrade of proxy instances within a managed contract ecosystem. Such environments can include multiple smart contracts that interact across shared interfaces, where access control, implementation validation, or version compatibility are managed through one or more governance mechanisms implemented in code.

Distributed computing environments supporting such proxy and control-plane patterns may include blockchain networks operable to execute smart contracts that reference other on-chain contracts for ownership, validation, or compatibility information. These environments can be applied to financial, operational, or enterprise applications that utilize distributed ledger infrastructures to ensure traceability and determinism in contract behavior across versions or deployments.

SUMMARY

Although distributed ledger platforms provide a deterministic and verifiable environment for executing programmatic transactions, management of executable contracts, such as smart contracts, within such environments presents a number of technical challenges. In particular, as blockchain ecosystems mature to support enterprise-grade applications, it becomes increasingly important to provide mechanisms for secure configuration, controlled upgradeability, and validation of executable contract implementations deployed across the network.

A first challenge arises from the decentralized and immutable nature of blockchain deployments. Once an executable, such as a smart contract is deployed, its code cannot typically be modified. To introduce new functionality or fix a defect, developers may rely on proxy-based patterns that delegate logic execution to separate implementation contracts. However, coordination of ownership, permissions, or other administrative attributes across large groups of proxy contracts can become computationally inefficient and operationally complex when each proxy must be individually reconfigured on-chain. For example, a financial institution may deploy many proxy contracts for different clients, each managed by a common administrative account. If the administrator's address must be rotated for security or key management reasons, upgrading each proxy individually would require many on-chain transactions, consuming excessive computational resources and increasing the likelihood of inconsistent configuration.

A second challenge involves trust and authenticity of implementation code. Because implementation contracts execute logic on behalf of proxies, a misconfigured or malicious implementation reference can alter contract behavior or corrupt persistent storage. Existing verification tools generally perform source-level or off-chain validation but do not allow on-chain verification of implementation integrity as a precondition for deployment or upgrade. Ensuring that only validated implementation contracts can be referenced on-chain therefore presents a technical requirement for secure operation in distributed environments. For example, a proxy may be upgraded to point to a new implementation contract that was incorrectly deployed or tampered with, resulting in unexpected behavior such as unauthorized transfers, incorrect accounting logic, or memory corruption within the proxy's persistent storage. Without an on-chain record of implementation validity, the system may not be capable of reliably detecting or preventing such misconfiguration at the time of upgrade.

A third challenge relates to ensuring upgrade compatibility between a proxy contract and a new implementation contract to which it is being reassigned. Delegate-call semantics require that an implementation contract expect a specific memory layout and interface structure. If a proxy is upgraded to an incompatible implementation, the memory state of the proxy may become unrecoverable. Existing frameworks typically rely on manual auditing or off-chain checks to assess compatibility, which can introduce risk and inconsistency during upgrade operations. For example, upgrading a token-management proxy to reference an oracle-type implementation with a different memory layout may cause stored balances or configuration values to be overwritten or misinterpreted. Because the proxy's state is preserved during the upgrade, a mismatch between expected and actual memory schemas may, for example, irreversibly corrupt contract data or render the proxy inoperable within the distributed ledger environment.

These challenges—administrative scalability, on-chain implementation trust, and upgrade compatibility—create conditions under which large-scale smart contract ecosystems may experience security, performance, or reliability limitations. The embodiments described herein address these and other limitations by introducing coordinated, on-chain control mechanisms for managing administrative authority, verifying implementation validity, and validating upgrade compatibility within proxy-based smart contract architectures.

In some embodiments, the systems and methods described herein provide a unified framework for managing executable contracts deployed within a distributed execution environment. Such environments may, for example, include distributed ledger platforms (e.g., blockchain networks) that support programmatic execution of code modules, sometimes referred to as smart contracts, that maintain or modify on-chain state through verifiable transactions. The disclosed framework may encompass mechanisms for coordinating administrative control, verifying authenticity or integrity of executable logic, and validating compatibility of upgrades or configuration changes across multiple interrelated contracts or modules. These capabilities may enable distributed applications to operate with improved consistency, determinism, auditability, or operational efficiency across large-scale deployments. Although embodiments are described in the context of blockchain-based implementations for illustrative clarity, the underlying techniques may be applied to other distributed or verifiable execution systems that employ similar mechanisms for decentralized logic execution, state persistence, or governance control across heterogeneous network environments.

Provided in some embodiments is a computer-implemented method for validated upgrading of executable contracts, the method including: storing, in an implementation contract stored on a distributed ledger, implementation data, the implementation contract including executable implementation logic; obtaining, by an upgrade validator, the implementation data for the implementation contract; receiving, by the upgrade validator, a request to update a proxy contract stored on the distributed ledger to store a reference to the implementation contract for execution of the implementation logic in place of a current reference to a current implementation contract stored in the proxy contract; determining, by the upgrade validator based on the implementation data for the implementation contract, that the implementation contract is (a) compatible with the proxy contract, and (b) a compatible version with the current implementation contract stored in the proxy contract; and upgrading, by the upgrade validator based on determining that the implementation contract is (a) compatible with the proxy contract, and (b) a compatible version with the current implementation contract, the proxy contract to store the reference to the implementation contract in the proxy contract in place of the current reference to the current implementation contract stored.

In some embodiments, the method further including: receiving, by the proxy contract, an execution request that relies on execution of the implementation logic; and sending, by the proxy contract to the implementation contract based on the reference of the proxy contract to the implementation contract for execution of the implementation logic, an implementation execution request. In some embodiments, the method further including: receiving, by the upgrade validator, a request to upgrade a proxy contract stored on the distributed ledger to store a reference to a second implementation contract in place of a current reference to a current implementation contract stored in the proxy contract; determining, by the upgrade validator based on the implementation data for the second implementation contract, that the second implementation contract is (a) not compatible with the proxy contract, or (b) not a compatible version with the current implementation contract stored in the proxy contract; and inhibiting, by the upgrade validator based on determining that the second implementation contract is (a) not compatible with the proxy contract, or (b) not a compatible version with the current implementation contract stored in the proxy contract, upgrading of the proxy contract to store the reference to the second implementation in the proxy contract in place of the current reference to the current implementation contract stored. In some embodiments, the implementation data for the implementation contract includes a contract type and a contract version. In some embodiments, the implementation data for the implementation contract including validation credentials for the implementation contract, the method further including: determining, by the upgrade validator, that the validation credentials are valid, where updating of the proxy contract is conducted further based on determining that the validation credentials are valid. In some embodiments, the method further including: obtaining, by the upgrade validator from the proxy contract, proxy parameters for the proxy contract, where the proxy parameters indicate a compatible contract type and a version of the current implementation contract.

Provided in some embodiments is a system including: a processor; and non-transitory computer readable storage medium including program instructions stored thereon that are executable by a processor to cause the following operations for validated upgrading of executable contracts: storing, in an implementation contract stored on a distributed ledger, implementation data, the implementation contract including executable implementation logic; obtaining, by an upgrade validator, the implementation data for the implementation contract; receiving, by the upgrade validator, a request to upgrade a proxy contract stored on the distributed ledger to store a reference to the implementation contract for execution of the implementation logic in place of a current reference to a current implementation contract stored in the proxy contract; determining, by the upgrade validator based on the implementation data for the implementation contract, that the implementation contract is (a) compatible with the proxy contract, and (b) a compatible version with the current implementation contract stored in the proxy contract; and upgrading, by the upgrade validator based on determining that the implementation contract is (a) compatible with the proxy contract, and (b) a compatible version with the current implementation contract, the proxy contract to store the reference to the implementation contract in the proxy contract in place of the current reference to the current implementation contract stored.

In some embodiments, the operations further including: receiving, by the proxy contract, an execution request that relies on execution of the implementation logic; and sending, by the proxy contract to the implementation contract based on the reference of the proxy contract to the implementation contract for execution of the implementation logic, an implementation execution request. In some embodiments, the operations further including: receiving, by the upgrade validator, a request to upgrade a proxy contract stored on the distributed ledger to store a reference to a second implementation contract in place of a current reference to a current implementation contract stored in the proxy contract; determining, by the upgrade validator based on the implementation data for the second implementation contract, that the second implementation contract is (a) not compatible with the proxy contract, or (b) not a compatible version with the current implementation contract stored in the proxy contract; and inhibiting, by the upgrade validator based on determining that the second implementation contract is (a) not compatible with the proxy contract, or (b) not a compatible version with the current implementation contract stored in the proxy contract, upgrading of the proxy contract to store the reference to the second implementation in the proxy contract in place of the current reference to the current implementation contract stored. In some embodiments, the implementation data for the implementation contract includes a contract type and a contract version. In some embodiments, the implementation data for the implementation contract including validation credentials for the implementation contract, the operations further including:

determining, by the upgrade validator, that the validation credentials are valid, where updating of the proxy contract is conducted further based on determining that the validation credentials are valid. In some embodiments, the operations further including: obtaining, by the upgrade validator from the proxy contract, proxy parameters for the proxy contract, where the proxy parameters indicate a compatible contract type and a version of the current implementation contract.

Provided in some embodiments is non-transitory computer readable storage medium including program instructions stored thereon that are executable by a processor to cause the following operations for validated upgrading of executable contracts: storing, in an implementation contract stored on a distributed ledger, implementation data, the implementation contract including executable implementation logic; obtaining, by an upgrade validator, the implementation data for the implementation contract; receiving, by the upgrade validator, a request to upgrade a proxy contract stored on the distributed ledger to store a reference to the implementation contract for execution of the implementation logic in place of a current reference to a current implementation contract stored in the proxy contract; determining, by the upgrade validator based on the implementation data for the implementation contract, that the implementation contract is (a) compatible with the proxy contract, and (b) a compatible version with the current implementation contract stored in the proxy contract; and upgrading, by the upgrade validator based on determining that the implementation contract is (a) compatible with the proxy contract, and (b) a compatible version with the current implementation contract, the proxy contract to store the reference to the implementation contract in the proxy contract in place of the current reference to the current implementation contract stored.

In some embodiments, the operations further including: receiving, by the proxy contract, an execution request that relies on execution of the implementation logic; and sending, by the proxy contract to the implementation contract based on the reference of the proxy contract to the implementation contract for execution of the implementation logic, an implementation execution request. In some embodiments, the operations further including: receiving, by the upgrade validator, a request to update a proxy contract stored on the distributed ledger to store a reference to a second implementation contract in place of a current reference to a current implementation contract stored in the proxy contract; determining, by the upgrade validator based on the implementation data for the second implementation contract, that the second implementation contract is (a) not compatible with the proxy contract, or (b) not a compatible version with the current implementation contract stored in the proxy contract; and inhibiting, by the upgrade validator based on determining that the second implementation contract is (a) not compatible with the proxy contract, or (b) not a compatible version with the current implementation contract stored in the proxy contract, upgrading of the proxy contract to store the reference to the second implementation in the proxy contract in place of the current reference to the current implementation contract stored. In some embodiments, the implementation data for the implementation contract includes a contract type and a contract version. In some embodiments, the implementation data for the implementation contract including validation credentials for the implementation contract, the operations further including: determining, by the upgrade validator, that the validation credentials are valid, where upgrading of the proxy contract is conducted further based on determining that the validation credentials are valid. In some embodiments, the operations further including: obtaining, by the upgrade validator from the proxy contract, proxy parameters for the proxy contract, where the proxy parameters indicate a compatible contract type and a version of the current implementation contract.

Provided in some embodiments is a computer-implemented method for validated upgrading of executable contracts, the method including: receiving, by an upgrade validator, a request to upgrade a proxy contract stored on the distributed ledger to store a reference to an implementation contract stored on a distributed ledger, the implementation contract including executable implementation logic and implementation data; obtaining, by the upgrade validator, the implementation data for the implementation contract; determining, by the upgrade validator based on the implementation data for the implementation contract, that the implementation contract is compatible with the proxy contract; and upgrading, by the upgrade validator based on determining that the implementation contract is compatible with the proxy contract, the proxy contract to store the reference to the implementation contract in the proxy contract.

Figure 1:
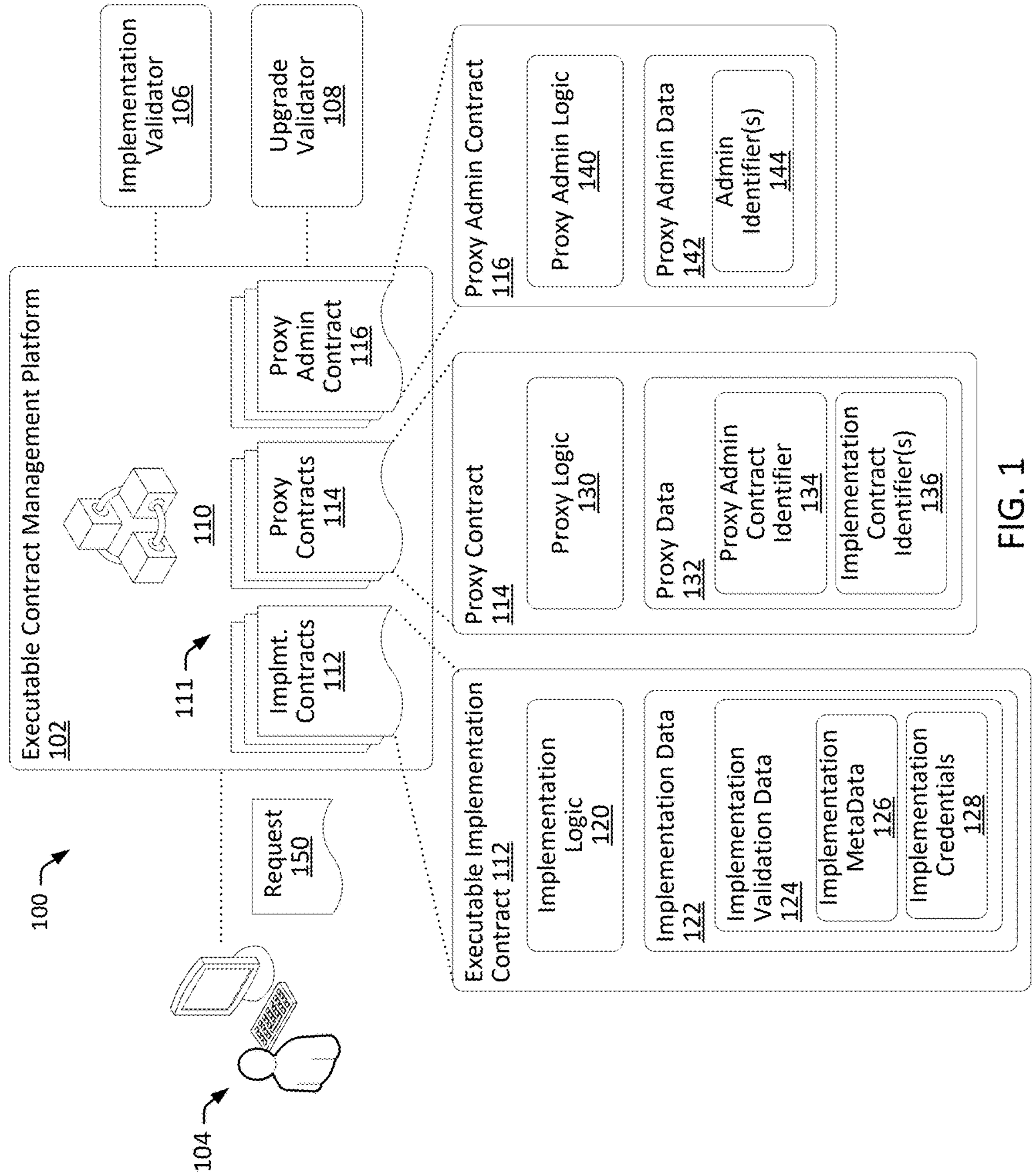
FIG. 1 is a diagram that illustrates a distributed execution environment in accordance with one or more embodiments.

While this disclosure is susceptible to various modifications and alternative forms, specific example embodiments are shown and described. The drawings may not be to scale. The drawings and the detailed description are not intended to limit the disclosure to the form disclosed, but are intended to disclose modifications, equivalents, and alternatives falling within the spirit and scope of the present disclosure as defined by the claims.

DETAILED DESCRIPTION

Provides are systems and methods that may provide a unified framework for managing executable contracts deployed within a distributed execution environment. Such environments may, for example, include distributed ledger platforms (e.g., blockchain networks) that support programmatic execution of code modules, sometimes referred to as smart contracts, that maintain or modify on-chain state through verifiable transactions. The disclosed framework may encompass mechanisms for coordinating administrative control, verifying authenticity or integrity of executable logic, and validating compatibility of upgrades or configuration changes across multiple interrelated contracts or modules. These capabilities may enable distributed applications to operate with improved consistency, determinism, auditability, or operational efficiency across large-scale deployments. Although embodiments are described in the context of blockchain-based implementations for illustrative clarity, the underlying techniques may be applied to other distributed or verifiable execution systems that employ similar mechanisms for decentralized logic execution, state persistence, or governance control across heterogeneous network environments.

In some embodiments, a control-plane architecture is provided for centralized management of administrative authority across groups of proxy executable contracts (e.g., proxy smart contracts) deployed on a distributed ledger. The architecture, for example, may employ a proxy administrator contract or other authoritative contracts that maintains a shared record of administrative ownership or other access credentials. Proxy contracts may each include a reference to the proxy administrator contract rather than storing independent administrative data, such as local storage of administrative ownership or other access credentials. When an operation requiring elevated privileges is invoked, for example, the proxy contract can query the shared proxy administrator contract to retrieve the administrative credentials and determine whether the requestor has appropriate authority (e.g., whether the requestor identifier corresponds to an administrator identifier). In this manner, a single on-chain administrator reference can govern a plurality of proxy contracts without requiring individual state updates for each proxy.

The disclosed control-plane systems and processes may provide a scalable mechanism for unified administrative control among proxy contracts, enabling administrative or ownership updates to be executed in constant time with respect to the number of proxies affected. The proxy logic within each proxy contract may, for example, be aware that it stores a reference to a proxy administrator contract (e.g., administrator identifier, such as an address, key, or other credential), and that the proxy administrator contract itself stores an administrator identifier (such as an address or public key) in a defined storage location. During privileged operations, the proxy contract may perform a chained lookup—first querying its own storage to identify the proxy administrator contract, and then querying the proxy administrator contract to retrieve the administrator identifier. Administrative authority may, for example, be verified by comparing the requestor identifier against the retrieved administrator identifier, ensuring that all proxies referencing the same administrator contract enforce the same control logic.

For example, consider an enterprise deploying a digital asset management platform that includes a fleet of proxy smart contracts, each representing a client-specific account or instrument. Each proxy contract may delegate logic to a corresponding implementation contract but store a reference to a shared proxy administrator contract for access control. When the enterprise rotates its administrative key (e.g., for security purposes), the administrator contract is updated once to store a new administrator identifier. Each proxy that references the administrator contract automatically recognizes the new administrator credentials during subsequent privileged calls, eliminating the need to modify many individual proxies. In this example, the same administrative update may apply to many on-chain contracts yet consume the computational cost of a single transaction.

Conventional access-control frameworks for smart contracts, such as role-based or ownership libraries, generally define administrative privileges at the level of individual contracts. In such frameworks, each proxy contract typically maintains its own owner or role mappings, requiring independent updates whenever an administrative change occurs. Certain disclosed embodiments externalize administrative state into a distinct proxy administrator contract, which can serve as a single point of reference for multiple proxies. Additionally, the architecture may enable the proxy or implementation logic to explicitly recognize and interact with the administrator reference during execution, thereby achieving cross-contract privilege enforcement that is natively verifiable on-chain.

The described control-plane system may provide significant technical and operational benefits in multi-contract ecosystems. For example, by decoupling administrative state from individual proxies, the system may reduce gas consumption and simplify key-rotation procedures. Administrative actions—such as designating new operators, pausing contract functionality, or authorizing upgrades—may be performed across all managed proxies in a single, atomic transaction. This approach may minimize configuration drift, ensure consistent access policy enforcement, and improve auditability of administrative changes. In commercial contexts, these capabilities may enable custodians, asset servicers, or distributed financial institutions to efficiently manage large portfolios of smart contracts while maintaining compliance, security, or operational continuity within a distributed ledger environment.

In some embodiments, a validation framework is provided for authenticating executable contracts (e.g., smart contracts) on a distributed ledger before such contracts are referenced or executed. The framework, for example, may enable an implementation contract to maintain validation credentials or other data within its own on-chain storage so that other contracts can query it and determine if the contract has been verified. This approach may allow the validity of an implementation contract to be confirmed directly on-chain, prior to any use of the implementation contract, such as an execution or upgrade operation that references the implementation contract, that may otherwise depend on off-chain trust or external review.

In some embodiments, the implementation contract may include one or more fields, such as a Boolean flag, digital signature, or cryptographic hash, that represents its validation state. The field may, for example, be updated only by an authorized validator or other trusted entity, ensuring that only properly reviewed contracts are assigned a "validated" status. When a proxy contract or control component initiates an operation that references the implementation contract, it may query the implementation contract's stored credentials and proceed with the operation only if the credentials indicate a verified state. This may include, proceeding to invoke the implementation logic or to modify a reference to point to the implementation logic, only if the credentials indicate a verified or valid state, and otherwise inhibiting execution. In this way, validation may be enforced as a pre-execution requirement as well as a pre-upgrade requirement. The use of the implementation contract's memory differs from the standard proxy pattern which utilizes the proxy's memory rather than the memory associated with the implementation contract.

For example, in the digital asset management platform described above, each proxy contract delegates execution to an implementation contract corresponding to a specific functional version, such as a transfer logic or reporting module. In some instances, when a user submits an execution request that relies on the implementation logic, the proxy contract may first query the implementation contract's validation credentials and continue only if the contract is validated. As another example, before a proxy is upgraded to point to a new implementation, the proxy administrator contract or other upgrade validator may invoke a validation query on that implementation. If the implementation contract's validation credentials indicate that the code has been reviewed and marked as trusted by an authorized validator, the administrator may proceed to update the proxy reference. If the validation credentials indicate an unverified state, the administrator may inhibit the update, thereby preventing accidental or malicious deployment of untrusted code. This validation step can occur within the same on-chain transaction that performs the upgrade, ensuring atomicity and preventing inconsistent states.

Conventional blockchain validation mechanisms generally rely on off-chain inspection or third-party services that compare published source code with on-chain bytecode to confirm authenticity. Such tools, while useful for transparency, do not permit on-chain enforcement of implementation trust at the time of execution, deployment, or upgrade. The embodiments described herein may record verification data directly in the implementation contract's storage, enabling any contract within the ecosystem to perform a deterministic on-chain query to confirm authenticity. This structure may enable the blockchain itself to act as the source of truth for implementation integrity, rather than requiring reliance on external validation infrastructure.

The disclosed on-chain validation framework may provide several technical and commercial advantages. By embedding validation data in the implementation contract, the system may reduce dependency on off-chain validation tools and enable atomic verification of implementation integrity during both execution and upgrade transactions. This can improve overall network security, prevent introduction of unauthorized or corrupted logic, and streamline governance workflows. In the context of the digital asset management platform, these capabilities may enable custodians or service providers to ensure that all deployed or upgraded logic modules are cryptographically verified prior to activation. Commercially, this may support enhanced client assurance, compliance reporting, or automated governance processes across large smart contract fleets within a distributed ledger environment.

In some embodiments, a validation framework is provided for confirming compatibility between a proxy contract and an implementation contract prior to an on-chain upgrade. The framework, for example, may employ an upgrade validator contract or other control component to determine whether a target implementation contract is suitable for use by a particular proxy. The upgrade validator contract may, for example, obtain implementation data from the target implementation contract, such as contract type, version number, validation state, or other contract metadata, and determine whether the implementation is compatible with the proxy contract's existing configuration or state. In some embodiments, the upgrade validator may also verify that the target implementation contract has a valid implementation validation credential or validation state, as described with respect to the implementation validation framework above, before permitting the upgrade. This compatibility check may be conducted on-chain and within the same transaction that performs the proxy upgrade, thereby reducing the potential for memory corruption or configuration errors during contract upgrade.

The disclosed upgrade validation systems and processes may enable a proxy contract to be safely updated from one implementation to another without requiring off-chain analysis or manual code review. In some embodiments, each implementation contract may include one or more stored fields representing its implementation metadata, such as a contract type identifier (e.g., "Token," "Oracle," or "Ledger") and a version identifier (e.g., "1.0," "2.0," or "3.0"). The upgrade validator (e.g., a proxy administrator contract or other administrator) may obtain these identifiers from the target implementation and compare them to parameters stored in the proxy, such as a compatible contract type or current version number. In some embodiments, the upgrade validator further queries the target implementation contract for implementation validation credentials, and determines that the implementation is both compatible and validated before authorizing the upgrade. If the retrieved metadata indicates that the implementation contract is compatible and represents a permitted version and the validation credentials are confirmed as valid, the proxy reference may be upgraded to point to the new implementation. If the metadata indicates an incompatible type or invalid version sequence (or an unverified validation state), the update may be inhibited, and the proxy may retain its existing configuration.

For example, in the digital asset management platform described above, each proxy contract may represent a client account and delegate its logic to an implementation contract corresponding to a particular version of the platform's transfer logic. When a new version of the transfer logic is deployed, the upgrade validator may query the implementation contract to obtain its metadata and verify that it corresponds to the same contract type (e.g., "Token") and a version number compatible with the version currently in use. It may also verify that the implementation contract possesses valid implementation validation credentials. If all such conditions are satisfied, the validator may proceed to upgrade the proxy reference to the new implementation within the same transaction. If either condition fails, such as when a proxy attempts to upgrade to an incompatible module type (e.g., an "Oracle" implementation), or an implementation that lacks valid validation credentials, the validator may prevent the upgrade, avoiding corruption of the proxy's stored balances or configuration state.

Existing upgrade frameworks often rely on manual auditing or external validation steps to ensure compatibility between contract versions. The embodiments described herein may allow compatibility checks to be encoded directly into the implementation contract itself, enabling deterministic on-chain evaluation of whether a particular proxy can safely delegate execution to a given implementation. In some embodiments, compatibility logic may also incorporate the validation data described above, allowing an upgrade validator to confirm both the authenticity and the compatibility (and validation status) of a target implementation contract before enabling use of the contract, such as permitting an upgrade to reference target implementation contract or invoking execution of the implementation logic.

The disclosed upgrade validation architecture may provide technical and operational advantages within distributed ledger environments. By verifying compatibility (and validation state) prior to upgrading proxy references, the system may reduce the risk of memory corruption, execution failure, or other unintended state transitions. This capability can enable organizations operating smart contract ecosystems—such as custodians, financial institutions, or decentralized service providers—to safely and predictably evolve on-chain applications. In the context of the digital asset management platform, these techniques may allow the enterprise to deploy controlled upgrades across many client contracts, ensuring that each proxy is linked only to validated and compatible implementations. Commercially, this may support continuous improvement of deployed smart contract services while maintaining consistency, auditability, and data integrity across all managed instances on the distributed ledger.

Although certain embodiments are described in the context of proxy-based smart contract architectures operating on blockchain or distributed ledger platforms, the systems and methods described herein are not limited to any particular network, protocol, or contract standard. The described techniques may, for example, be implemented in environments supporting various distributed consensus mechanisms, data models, or programming languages. Similarly, references to specific entities, data structures, or operational contexts, such as digital asset management, are intended merely as examples to facilitate understanding of the disclosed concepts. Equivalent structures, logic, or functionality may be applied in other contexts, including but not limited to decentralized finance, digital identity, supply chain management, or enterprise governance systems. Accordingly, the embodiments described herein are illustrative and may be adapted for use across a wide range of distributed computing environments.

The following embodiments illustrate representative implementations of the disclosed framework within a distributed execution environment. In some embodiments, the framework may include a control-plane architecture for centralized administration of executable contracts, a validation architecture for authenticating implementation logic prior to deployment or upgrade, and an upgrade-validation architecture for confirming compatibility between proxy contracts and new implementations. These embodiments are presented by way of example to demonstrate how the described systems and processes may be realized in various configurations, and are not intended to limit the scope of the disclosure.

FIG. 1 is a diagram that illustrates a distributed execution environment 100 in accordance with one or more embodiments. As illustrated, the environment 100 may include an executable contract management platform 102, one or more users 104, one or more implementation validators 106, and one or more upgrade validators 108. In some embodiments, one or more of the contract management platform 102, the user(s) 104, the implementation validator(s) 106, or the upgrade validator(s) 108 employs a computer system that is the same as, or similar to, the computing system 1000 illustrated and described with respect to FIG. 8. Such entities may communicate with one another over a distributed ledger network (e.g., a blockchain platform) supporting on-chain execution of the corresponding executable contracts.

In some embodiments, the contract management platform 102 is operable to support implementation of executable contracts (e.g., smart contracts) 111. This may include storage, modification, or execution of executable contracts 111, such as executable implementation contracts 112, proxy contracts 114, proxy administrator contracts (or "proxy admin contracts") 116, or similar executable contracts or modules. For example, the contract management platform 102 may provide for deployment of a proxy contract 114 that refers to one or more implementation contracts 112 having implementation logic for use in executing logical routines, where the proxy contract 114 further refers to a proxy administrator contract 116 storing an administrator identifier. In some embodiments, before executing a proxy contract's call for execution of implementation logic within an implementation contract (e.g., where the implementation logic requires elevated privileges), associated requesting user credential (e.g., a user identifier (ID)) is compared against an administrator credential (e.g., an administrator identifier (ID)) stored within a proxy administrator contract based on a reference to the proxy administrator contract stored in the proxy contract. This may, for example, be a pre-execution check conducted by the proxy contract or other executable contract or module. In some embodiments, before employing or modifying a reference to an implementation contract within a proxy contract, the implementation contract may be validated (e.g., using implementation credentials or other implementation validation data stored within, or otherwise associated with, the implementation contract) to ensure the authenticity and validity of the implementation logic prior to execution or prior to modification of the proxy's reference to the implementation contract. This may, for example, be a pre-implementation execution check or pre-implementation reference modification check conducted by the proxy contract or another executable contract or module. In some embodiments, before modifying a reference to an implementation contract within a proxy contract, implementation metadata, implementation credentials, or other implementation validation data stored within, or otherwise associated with, the implementation contract, is checked for one or both of compatibility with the proxy contract (e.g., for compatible contract type, version, or other configuration parameters) and validity (e.g., having valid implementation credentials). This may, for example, be a pre-implementation reference modification check conducted by an upgrade validator, which may be the proxy contract, a proxy administrator contract associated with the proxy contract, or another executable contract or module.

In some embodiments, the platform 102 includes a distributed ledger peer-to-peer (P2P) decentralized network (e.g., a blockchain or other distributed ledger platform) or the like. For example, the platform 102 may include a directed acyclic graph of cryptographic hash pointers. This may include a Merkle tree forming blocks, linked via pointers (e.g., between tree roots) to form a chain of blocks. The directed acyclic graph may be operable to immutably store executable contracts.

In some embodiments, a user 104 is a person, computing system, software module, or other entity operable to interact with the contract management platform 102 to create, modify, or employ execution of executable contracts. This may include, for example, submitting transactions to deploy a new implementation contract, initiating execution of a proxy contract, authorizing updates to administrative credentials stored in a proxy administrator contract, or requesting validation of an implementation contract by a validator component of the platform 102. For example, in one illustrative scenario, a user 104 may represent a financial institution operating a digital asset management service that employs a fleet of proxy contracts 114 to manage client-specific accounts. Each proxy contract 114 may reference one or more implementation contracts 112 defining operational logic (e.g., transfer or reporting functions) and may reference a proxy administrator contract 116 governing access control. The user 104 may, through the platform 102 (e.g., via a request 150), initiate transactions to update administrative identifiers, validate new implementation contracts 112 prior to deployment, or authorize upgrade of proxy references to compatible versions (e.g., current/newer versions) of implementation contracts 112 and their associated logic. In some embodiments, the user 104 may operate through a user system or interface application configured to communicate with the contract management platform 102 via network protocols compatible with the distributed execution environment 100. In some embodiments, the user 104 may be an automated agent, application, or composite entity acting on behalf of one or more organizations, clients, or service accounts, thereby supporting both human and machine-mediated operation within the environment 100.

In some embodiments, an implementation validator 106 is operable to interact with the contract management platform 102 to validate and record the validity (e.g., trust status) of implementation contracts 112. The implementation validator 106 may evaluate the authenticity and integrity of an implementation contract and its associated implementation logic (e.g., by verifying digital signatures, hashes, or other validation credentials) to confirm that the contract has been properly authorized and has not been tampered with. Upon successful validation, the implementation validator 106 may generate or update corresponding validation credentials that represent the verified state of the implementation contract. These credentials may be written directly into the implementation contract's on-chain storage (e.g., as implementation credentials 128 within implementation validation data 124) or recorded in another on-chain location accessible to the contract management platform 102. For example, in some embodiments, the validator 106 may store a validation flag, status field, timestamp, or validator signature within the implementation contract or a registry maintained by the platform 102. These validation credentials can then be queried by other entities—such as a proxy contract 114, a proxy administrator contract 116, or an upgrade validator 108—when determining whether an implementation contract is eligible for execution or reference. In some embodiments, the implementation validator 106 is implemented as an autonomous executable contract operating on the distributed ledger or as an off-chain agent that interfaces with the contract management platform 102 through secure application programming interfaces (APIs). Collectively, these operations may ensure that only implementation contracts with validated and trusted logic are deployed or utilized within the distributed execution environment 100, and that their verified state is deterministically available for subsequent validation or upgrade actions.

In some embodiments, an upgrade validator 108 is operable to interact with the contract management platform 102 to support validated upgrade of proxy contracts. This may include validating the compatibility of an implementation contract or other executable contract (e.g., based on metadata stored within the contract) or confirming that the implementation contract possesses valid validation credentials established by the implementation validator 106. For example, in the digital asset management platform scenario described above, the upgrade validator 108 may review implementation metadata stored in an implementation contract 112 to determine whether the contract is compatible with the proxy contract 114 to which it will be linked (e.g., by way of an implementation contract identifier 136 of the proxy contact 114) and whether it has an active or verified validation status recorded on-chain. Such metadata may include a contract type, version number, interface identifier, or other schema information indicating expected memory layout or operational dependencies. The upgrade validator 108 may then evaluate whether the candidate implementation contract 112 represents a permitted version or type relative to the current configuration of the proxy contract 114 and confirm that its validation credentials, such as signatures or flags, indicate authenticity and approval for use within the system. If the compatibility and validation requirements are met, the upgrade validator 108 may authorize or record the upgrade operation, allowing the proxy contract 114 to reference the new implementation contract 112 (e.g., by way of an implementation contract identifier 136 of the proxy contact 114). In some embodiments, the upgrade validator 108 may be implemented as an autonomous validator module within the contract management platform 102 or as an external validation service operating under administrative policy. In some embodiments, the upgrade validator 108 may also perform cross-checks with validation data maintained by the implementation validator 106 to ensure that the implementation contract being referenced has both a valid compatibility profile and a verified authenticity status. These capabilities may collectively ensure that proxy upgrades within the distributed execution environment 100 are both secure and consistent with system governance requirements.

In some embodiments, an executable contract 111 includes execution logic and associated data storage. The execution logic defines fixed or immutable code that determines how inputs are processed and what operations are performed when the contract is invoked. For example, execution logic may include one or more functions, rules, or state-transition routines that are compiled and stored on the distributed ledger at deployment and cannot be modified without redeployment. The data storage, by contrast, may be a mutable state area allocated to the contract for persisting variables, configuration parameters, or other values that may change over time. In some embodiments, the data storage is modifiable through authorized transactions that update stored variables while leaving the underlying execution logic unchanged. This separation between immutable logic and editable data allows the distributed execution environment 100 to maintain deterministic behavior and verifiable code integrity while still supporting configurable and upgradeable state management. For example, an executable contract 111 may include immutable transfer logic defining how asset balances are adjusted between accounts, while its editable data storage maintains the actual account balances, configuration flags, or administrative identifiers. In this manner, system participants can modify operational parameters or state values without redeploying or altering the contract's underlying code. In some embodiments, the data storage of an executable contract 111 is structured to reference other contracts, validation records, or external data sources, allowing inter-contract communication and modular composition of functionality.

In some embodiments, executable contracts 111 include additional logic or metadata for access control, validation, auditing, or version management. Execution logic may incorporate interfaces or function selectors enabling delegation to or invocation by other contracts or validator components. Data storage may include mappings, lists, or structured records representing relationships among users, contracts, or external systems and may include identifiers or pointers to validation data used by other validators or upgrade components. Although certain embodiments are described in the context of blockchain-based smart contracts, equivalent structures may be employed in other distributed or verifiable execution environments that support persistent contract state and deterministic logic execution. Accordingly, executable contracts 111 as described herein encompass combinations of immutable program logic and modifiable state data used to perform verifiable operations within the distributed execution environment 100. In some embodiments, executable contracts 111 are digital code entities deployed to the contract management platform 102 that execute deterministically in response to network transactions, function calls, or events. The executable contracts 111 collectively define logic and data structures that govern system behavior, asset management, or governance functions across the distributed execution environment 100. In some embodiments, the contract management platform 102 implements and coordinates executable contracts 111 that include one or more of implementation contracts 112, proxy contracts 114, and proxy administrator contracts 116, each configured to perform defined operations within the distributed execution environment 100.

In some embodiments, an implementation contract 112 is the executable contract within the distributed execution environment 100 that defines the underlying program logic or operational functionality used by other contracts, such as proxy contracts 114. This may include functions, procedures, or routines that implement core business rules, transaction flows, or data-processing logic to be invoked by other on-chain components. For example, in the digital-asset management platform scenario described above, an implementation contract 112 may include the functional code that performs transfers of digital assets between accounts, calculates balances or interest, or executes reporting and reconciliation processes. The implementation contract 112 may be directly referenced by one or more proxy contracts 114 and, through these relationships, provide the executable logic on which client-specific or account-specific contract instances operate or may be validated for authenticity and compatibility prior to reference or execution by such proxies.

In some embodiments, an implementation contract 112 includes implementation logic 120 and implementation data 122. The implementation logic 120 may represent the immutable or non-modifiable code segment that performs the defined operations of the contract. The implementation data 122 may represent the modifiable storage segment of the contract used to maintain configuration parameters, validation records, or validation information associated with the implementation logic 120. The implementation data 122 may include, for example, implementation-validation data 124, which may in turn include implementation metadata 126 or implementation credentials 128. Together, these components may enable other entities within the contract management platform 102—such as proxy contracts 114, proxy administrator contracts 116, or validator components 106 and 108—to identify, authenticate, and manage the implementation contract 112 for execution or upgrade operations and to confirm whether its logic has been validated and approved for deployment or upgrade.

In some embodiments, the implementation logic 120 defines the executable routines or functions that execute operations of the implementation contract 112. For example, the implementation logic 120 in a digital-asset transfer contract may include routines for validating transaction parameters, updating internal state variables representing account balances, and recording transfer events on the distributed ledger. In some embodiments, the implementation data 122 provides the associated mutable state or configuration storage. Within the implementation data 122, the implementation-validation data 124 may store validation attributes such as flags, timestamps, or references to authorized validators indicating whether the implementation contract 112 has been verified by an implementation validator 106 or other trusted authority. The implementation metadata 126 may include descriptive attributes—such as contract type, version number, interface definitions, or schema identifiers—that define the expected memory layout or interaction model for the contract. The implementation credentials 128 may include cryptographic signatures, hashes, or other attestations confirming the authenticity or integrity of the implementation logic 120 and may be updated by the implementation validator 106 following successful validation of the implementation contract or its logic. In the digital-asset management example, the implementation metadata 126 may specify that the contract type is "Token," that its version is "2.1," and that it exposes standard transfer and balance-query interfaces, while the implementation credentials 128 may include a validator-signed certificate verifying the code hash deployed to the network.

In some embodiments, the implementation contract 112 is configured to expose its validation state or metadata to other contracts or validator components through query functions or public variables. This allows entities such as proxy contracts 114 or upgrade validators 108 to retrieve validation information in real time before executing or referencing the implementation contract 112. In some embodiments, the implementation contract 112 includes access-control logic that restricts modification of its implementation data 122 to authorized validator addresses, administrator entities, or governance processes. The implementation validation data 124, including implementation metadata 126 or implementation credentials 128, may be written or updated by authorized third-party entities such as designated validators, auditors, or governance agents. For example, an implementation validator 106 may execute transaction invoking a "SET_VALIDATION_STATUS" or "SET_CREDENTIAL" function exposed by the implementation contract 112 to record updated validation information or credentials within the implementation credentials 128 of the implementation validation data 124 or another persistent on-chain storage area. In other cases, administrative entities acting under governance policy may issue update calls (e.g., "SET_METADATA") to revise version or compatibility indicators stored in the implementation metadata 126. These calls may be restricted through access-control lists or signature verification to ensure that only trusted authorities can alter the validation state. This structure ensures that while the core execution logic remains immutable, the validation data and metadata associated with that logic can be securely updated to reflect governance actions, audits, or upgrades, thereby maintaining both functional stability and system adaptability within the distributed execution environment 100 and ensuring that validation status and integrity records remain available for downstream verification or upgrade operations.

In some embodiments, a proxy contract 114 is the executable contract within the distributed execution environment 100 that serves as an intermediary between external users and one or more implementation contracts 112. The proxy contract 114 may enable upgradeability and modular operation by, for example, maintaining its own persistent data while delegating functional execution to referenced implementation contracts. This may include receiving calls or transactions from users or other contracts, determining which implementation contract 112 to invoke, and forwarding or "delegating" the call to that implementation contract while preserving the proxy's local state. For example, in the digital-asset management platform scenario, each client account may be represented by a distinct proxy contract 114. The proxy contract 114 may maintain local data representing the client's account state (e.g., balances, permissions, and configuration parameters) while delegating execution of transfer, reporting, or accounting logic to shared implementation contracts 112 that have been validated for authenticity or compatibility prior to delegation. As used herein, the term "proxy" may refer to an executable contract that serves as an intermediary or interface layer between a caller and a target contract (e.g., an implementation contract). In an object-oriented context, the proxy may be viewed as an object instance that exposes the same external interface as its corresponding class (the implementation contract) but delegates the underlying method execution to that implementation while maintaining its own local state. This separation allows the proxy to intercept, authorize, or redirect function calls without modifying the underlying implementation logic, thereby supporting controlled upgradeability, access enforcement, and persistent data storage across logic versions. For example, in a distributed-ledger environment, a proxy smart contract may maintain user balances and configuration data on-chain while forwarding functional calls—such as asset transfer or reporting operations—to a referenced implementation contract that contains shared business logic. When the implementation contract is upgraded (e.g., to fix a defect or extend functionality), the proxy can be reassigned to the new implementation without migrating stored user data, ensuring continuity of on-chain state while allowing the executable logic to evolve over time.

In some embodiments, a proxy contract 114 includes proxy logic 130 and proxy data 132. The proxy logic 130 may define the executable functions or routines that execute operations of the proxy contract 114, such as managing delegation and access control. The proxy data 132 may provide the associated persistent storage that maintains account-specific or configuration-specific data. The proxy data 132 may, for example, include one or more proxy administrator-contract identifiers 134 referencing a corresponding proxy administrator contract 116, and one or more implementation-contract identifiers 136 referencing the implementation contracts 112 that supply the logic for delegated execution or that are candidates for upgrade validation. Together, these elements may allow the proxy contract 114 to act as a persistent interface layer between users and shared implementation logic, while ensuring that control and validation operations remain governed by the designated administrator and validator components within the contract management platform 102 and that referenced implementation contracts are validated or compatible before execution or upgrade.

In some embodiments, the proxy logic 130 includes functions that manage the delegation of function calls to the appropriate implementation contracts 112. This may include a dispatcher routine that intercepts incoming calls, retrieves the target implementation-contract identifier 136, and executes the implementation logic 120 through a delegate-call or equivalent mechanism, preserving the proxy's own memory context. The proxy logic 130 may also include access-control routines that consult the proxy administrator contract 116 to verify administrative credentials or permissions before allowing privileged operations or execution of implementation logic requiring elevated privileges. In some embodiments, the proxy data 132 includes variables or mappings that store account balances, configuration flags, and references to administrative or implementation contracts. In some embodiments, the proxy administrator-contract identifier 134 serves as a pointer to the governing proxy administrator contract 116, which stores and maintains administrator identifiers 144 used for validating authorization requests. The implementation-contract identifiers 136 may represent references to one or more implementation contracts 112 whose logic is delegated for execution by the proxy contract 114 or verified by an implementation validator 106 or upgrade validator 108 before being linked or executed. For example, in the digital-asset management context, a proxy contract 114 representing a client account may maintain one implementation-contract identifier 136 referencing a "TokenTransfer" implementation contract and another referencing a "Reporting" implementation contract, enabling both transactional and analytical functionality through the same proxy while ensuring that each linked implementation contract has a valid validation credential or compatibility record prior to use.

In some embodiments, the proxy contract 114 includes administrative or control functions for updating its references or stored state. For example, an authorized administrator or governance process may invoke a "SET_ADMIN_CONTRACT" or "SET_IMPLEMENTATION_CONTRACT" function on the proxy contract 114 to modify the proxy administrator-contract identifier 134 or implementation contract identifiers 136, respectively. These updates may be restricted by access-control logic within the proxy logic 130, requiring that the caller's credentials match the administrator identifiers 144 stored in the referenced proxy administrator contract 116. In some embodiments, updates to implementation-contract identifiers 136 are further conditioned on validation results or compatibility checks performed by the implementation validator 106 or the upgrade validator 108, ensuring that new implementation references correspond to verified, validated, or compatible contracts. The proxy contract 114 may also expose query functions allowing users or other contracts to retrieve references, balances, or configuration details without altering state. This structure ensures that while the proxy logic 130 remains immutable, the proxy data 132 (e.g., the identifiers 134 and 136) may be securely updated under controlled governance, maintaining flexibility and upgradeability without compromising security or integrity of the distributed execution environment 100 and ensuring that all delegated or upgraded execution logic originates from verified implementation sources.

In some embodiments, a proxy administrator contract 116 is the executable contract within the distributed execution environment 100 that governs administrative authority and access control for one or more proxy contracts 114. The proxy administrator contract 116 may, for example, define and enforce who is authorized to perform privileged actions-such as updating proxy references, modifying configuration parameters, or initiating upgrades-across groups of proxy contracts that reference it. This may include maintaining records of authorized administrator identifiers, validating incoming administrative requests, and coordinating administrative operations across associated proxy instances. For example, in the digital-asset management platform scenario, a single proxy administrator contract 116 may govern hundreds of proxy contracts 114 associated with client accounts, allowing the enterprise to rotate or delegate administrative privileges from one on-chain location rather than updating each proxy individually and optionally allowing validator components (e.g., implementation validator 106 or upgrade validator 108) to observe or log such administrative actions for governance enforcement.

In some embodiments, a proxy administrator contract 116 includes proxy administrator logic 140 and proxy administrator data 142. In some embodiments, the proxy administrator logic 140 defines the executable functions or routines that execute operations of the proxy administrator contract 116, such as executable routines for verifying administrative requests, updating stored administrator identifiers, and authorizing or denying privileged operations based on validation or policy criteria. In some embodiments, the proxy administrator data 142 provides associated persistent storage that maintains the administrative identifiers and related configuration state and may include governance metadata, such as timestamps, validator attestations, or rotation records, to support auditability. The proxy administrator data 142 may include one or more administrator identifiers 144 that represent accounts, keys, or credentials authorized to perform administrative actions on proxy contracts 114 that reference the proxy administrator contract 116. Together, these elements may enable centralized and verifiable management of administrative privileges while maintaining separation between control functions and business-logic execution within the distributed execution environment 100 and providing deterministic, on-chain traceability for governance actions.

In some embodiments, the proxy administrator logic 140 includes functions for validating and processing administrative actions. This may include a routine that receives an administrative update request, verifies that the caller's address or credential matches one of the administrator identifiers 144 stored in the proxy administrator data 142, and, if verified, performs the requested operation. The proxy administrator logic 140 may also include routines for adding, removing, or rotating administrative credentials; pausing or resuming contract operations; and propagating authorized updates to one or more proxy contracts 114 or other dependent components within the platform 102. The proxy administrator data 142 may store variables such as current administrator addresses, rotation counters, or status flags that control whether administrative actions are active. The administrator identifiers 144 may include blockchain addresses, digital certificates, or public keys used to authenticate privileged calls. For example, in the digital-asset management platform scenario, an enterprise administrator may submit a governance transaction invoking a "SET_ADMIN" or "ROTATE_ADMIN_KEY" function within the proxy administrator contract 116 to update the stored administrator identifiers 144. Once updated, all proxy contracts 114 referencing that proxy administrator contract 116 automatically recognize the new administrator credentials during subsequent authorization checks, eliminating the need to modify each proxy individually and ensuring that the administrative update is visible to other validator components for policy validation or compliance tracking.

In some embodiments, updates to the proxy administrator data 142 are restricted to authorized entities or governance processes. For example, only addresses listed in the administrator identifiers 144 may invoke update calls such as "SET_ADMIN," "REMOVE_ADMIN," or "TRANSFER_OWNERSHIP." These calls may be verified through signature authentication, multi-party approval, or time-based policies to prevent unauthorized administrative changes. In some embodiments, validator components 106 or 108 may log or confirm administrative updates for auditability within the distributed ledger or may validate that the administrative update meets defined governance requirements prior to finalization. The proxy administrator contract 116 may also expose query functions that allow proxy contracts 114 or external users to retrieve current administrator identifiers 144 or administrative-status information without modifying state. This structure may ensure that administrative control is centralized, auditable, and securely updatable, while the underlying administrative logic 140 remains immutable, thereby maintaining both security and operational efficiency across the distributed execution environment 100 and enabling coordinated, validator-assisted governance across multiple proxy groups.

In some embodiments, each executable contract 111 employs a local memory and storage context that is isolated from other contracts, and reads or writes occur against the caller's local state unless an execution-by-reference mechanism (e.g., delegate-style invocation) is expressly used. The proxy contract 114 may, for example, persists business state in its proxy data 132, while the implementation contract 112 maintains implementation data 122 primarily for validation, metadata, and credential records rather than end-user balances or account state. During delegated execution, the implementation logic 120 may execute while reading from and writing to the proxy contract's local storage, thereby enabling functionality upgrades without migrating business state. Conversely, administrative information remains in the proxy administrator contract's local storage (e.g., in proxy administrator data 142), and validation information remains in the implementation contract's local storage (e.g., in implementation validation data 124), preserving clear state boundaries among control, validation, and business domains while ensuring that each contract or validator component operates deterministically within its assigned memory context. This separation of local memory contexts enhances upgrade safety, reduces unintended cross-contract writes, supports atomic fleet-level administration without state duplication, and improves auditability by ensuring that each contract's responsibilities map to its own verifiable on-chain storage and that validators or governance processes can audit these state domains independently.

Figure 2:
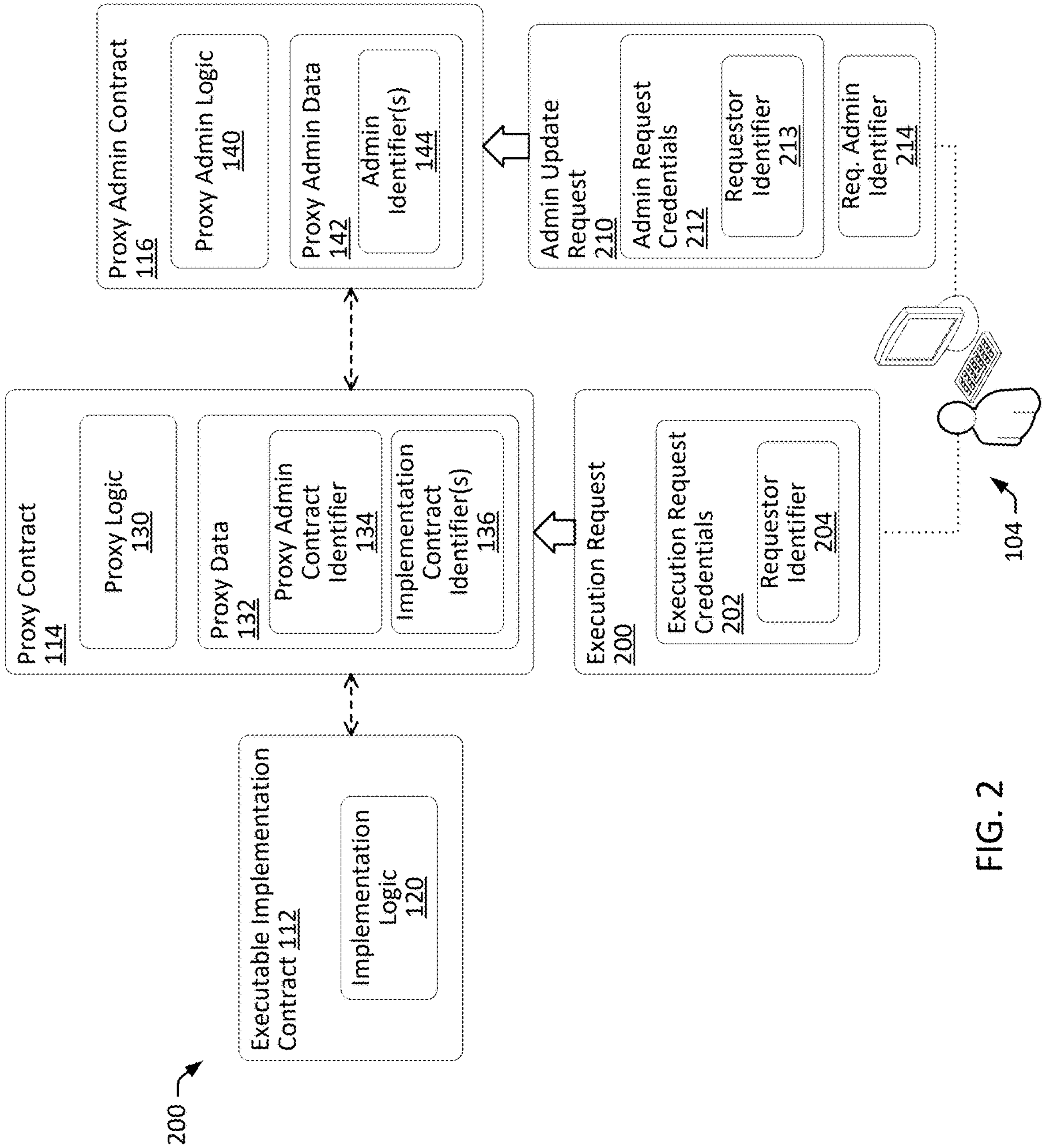
FIG. 2 is a diagram that illustrates a distributed execution environment control-plane architecture in accordance with one or more embodiments.
Figure 3:
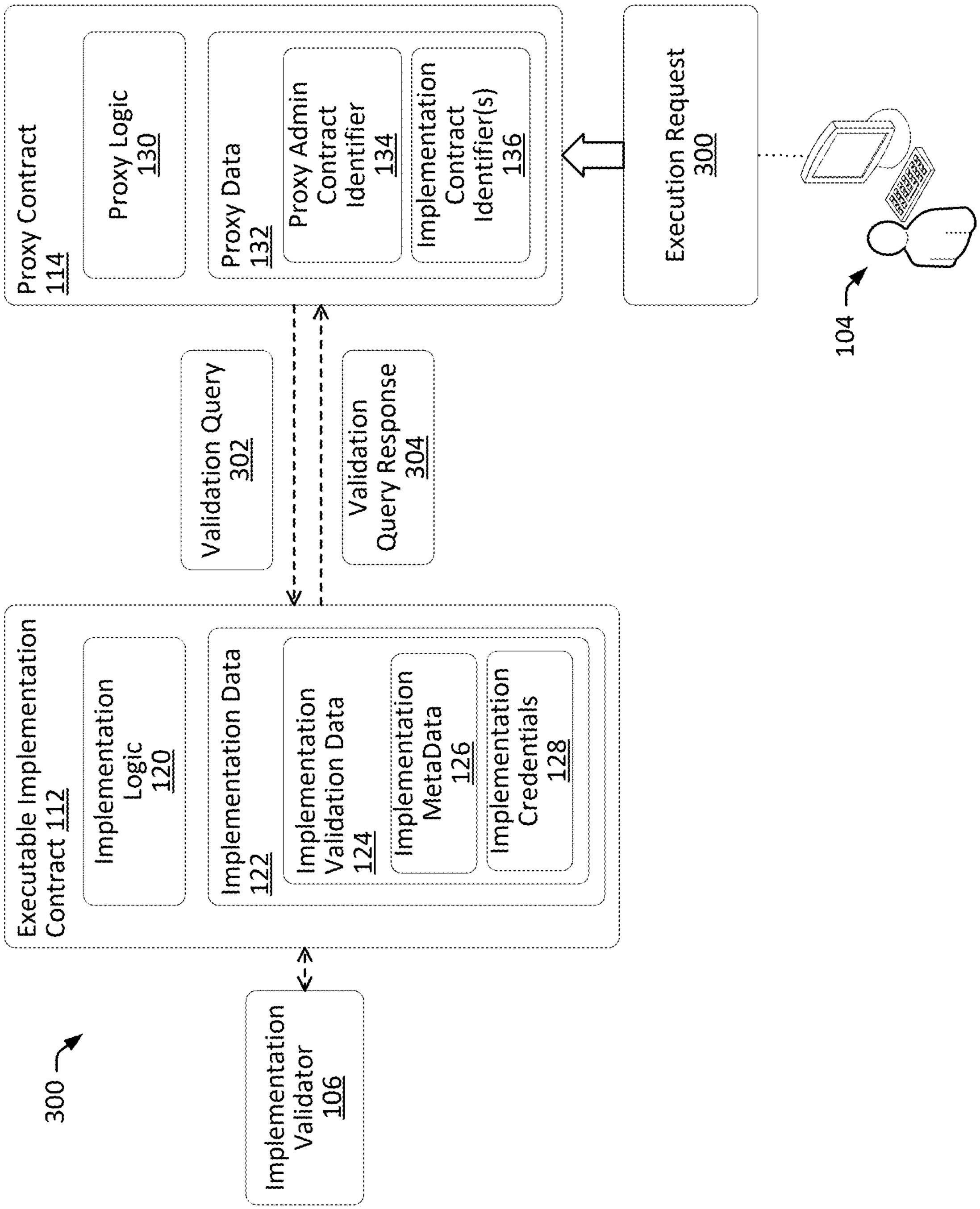
FIG. 3 is a diagram that illustrates a distributed execution environment implementation-validation architecture in accordance with one or more embodiments.
Figure 4:
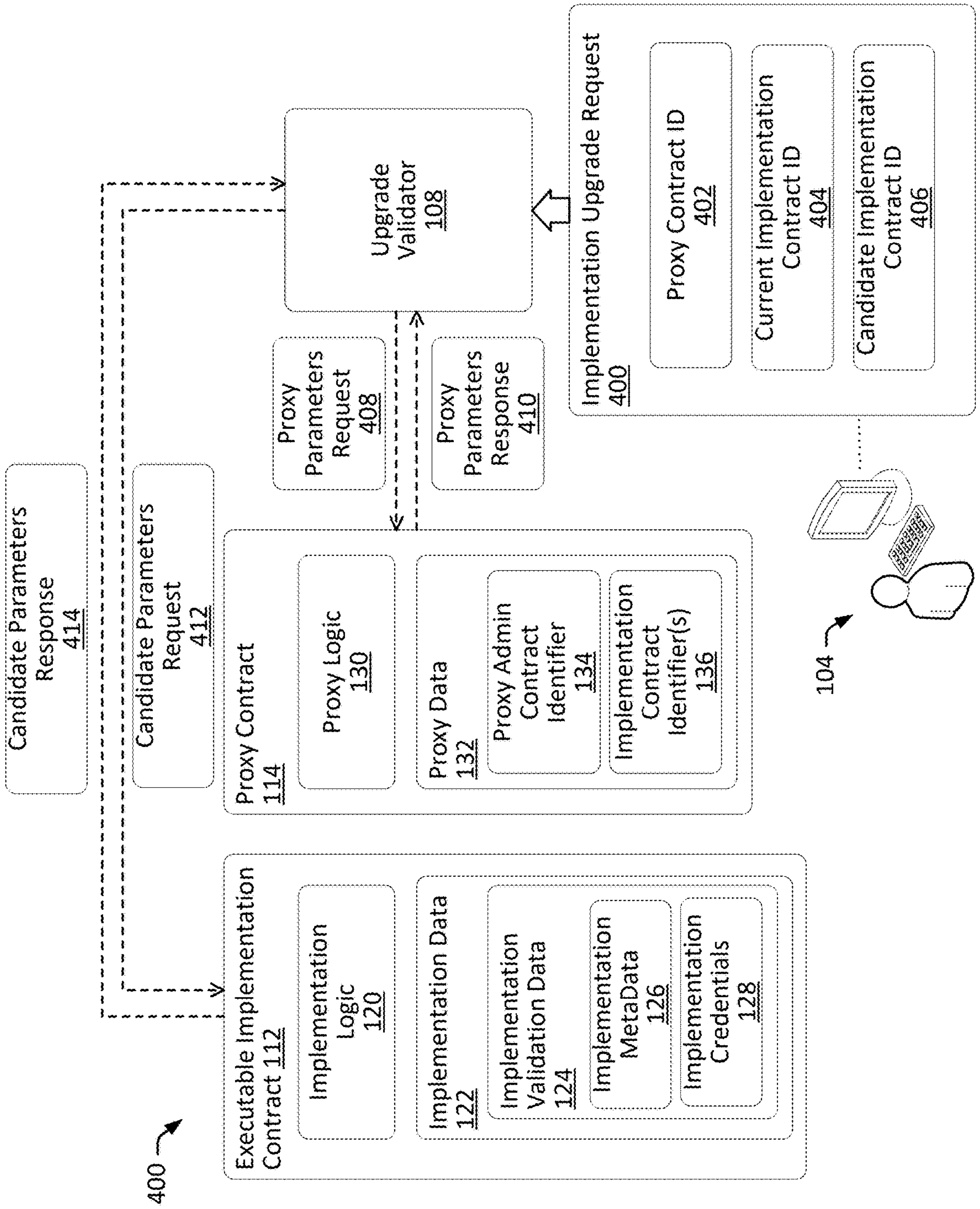
FIG. 4 is a diagram that illustrates a distributed execution environment proxy-upgrade validation architecture in accordance with one or more embodiments.

The components described above may operate in cooperation to implement the coordinated control, validation, or upgrade functions of the disclosed framework. As described in greater detail with respect to FIGS. 2-4, the control-plane operations shown in FIG. 2 illustrate centralized administrative control across multiple proxy contracts 114 through a shared proxy administrator contract 116; the implementation-validation operations shown in FIG. 3 illustrate authentication and verification of implementation contracts 112 through interaction with an implementation validator 106; and the proxy-upgrade-validation operations shown in FIG. 4 illustrate compatibility and upgrade management of proxy contracts 114 and implementation contracts 112 through interaction with an upgrade validator 108 or related governance components. Collectively, these architectures demonstrate how administrative authority, validation state, and upgrade compatibility may be managed and enforced within the distributed execution environment 100 in a modular, validator-assisted framework that maintains deterministic on-chain verification across contracts.

Taken together, the systems and processes described provide significant technical advantages for large-scale distributed-ledger applications. By separating immutable execution logic from mutable state data and by introducing on-chain mechanisms for centralized control, validation, and upgrade governance, the framework improves operational efficiency, security, and auditability without sacrificing determinism. Administrative actions are applied atomically across contract fleets, validation of implementation code occurs on-chain and in real time, and upgrades are executed safely with confirmed compatibility. These capabilities support continuous evolution of enterprise or institutional smart-contract ecosystems while maintaining integrity of on-chain state, reducing operational cost, and simplifying compliance and lifecycle management within the distributed execution environment 100 and enabling verifiable coordination among administrative, validation, and upgrade components operating within that environment.

FIG. 2 is a diagram that illustrates a distributed execution environment control-plane architecture 200 in accordance with one or more embodiments. As illustrated, the control-plane architecture 200 may include an implementation contract 112, a proxy contract 114, and a proxy administrator contract 116.

In some embodiments, a user 104 submits an execution request 200 intended for processing by the proxy contract 114, which may, for example, include instructions to cause execution of associated implementation logic 120 of the implementation contract 112. As illustrated, the execution request 200 may include a request for execution of a process (e.g., a process that relies on execution of the implementation logic 120 of the implementation contract 112) and execution request credentials 202 (e.g., a requestor identifier 204), which can be employed to verify privileges required for execution of the implementation logic 120. For example, in one embodiment, the user 104 may be an administrative operator "Alice_Admin," identified by a blockchain address 0xADMN-C001, submitting an execution request 200 to perform a pauseTransfers( ) operation for a proxy contract 114 named Proxy_Client_A. The execution request 200 may include execution-request credentials 202 containing a requestor identifier 204 equal to 0xADMN-C001 and a digital signature sig_Alice_2025 verifying Alice_Admin's authorization.

In an example embodiment, the user 104 submits an execution request 200 to the proxy contract 114 for processing. The proxy contract 114 may execute corresponding proxy logic 130 to analyze the request. Based on an implementation contract identifier 136 stored in proxy data 132, the proxy logic 130 may determine that processing of the request 200 relies on execution of the implementation logic 120 of the implementation contract 112. For instance, the proxy logic 130 of Proxy_Client_A may identify the implementation-contract identifier 136 as Impl_TokenTransfer_V2, indicating the target implementation contract 112 that provides the pauseTransfers( ) function. Responsive to that determination, the proxy contract 114 may determine that the implementation logic 120 requires confirmation that the requestor possesses sufficient authority to invoke execution of the implementation logic 120. This may, for example, be based on a call to the implementation contract 112. For example, the proxy logic 130 may send a preliminary call to the implementation contract 112 to initiate execution of the implementation logic 120. The implementation contract 112 may respond with an indication that the requested execution requires administrative authorization, thereby prompting the proxy logic 130 to perform an authorization check. Continuing with the above example, the proxy logic 130 may issue a preliminary call preCheckPrivilege("pauseTransfers") to the implementation contract 112, which responds with a return code REQUIRES_ADMIN and a short message "Admin privilege required for this operation". In another embodiment, this may, for example, be based on the proxy logic 130 referencing a record stored in the proxy data 132 or other location accessible to the proxy contract 114. For example, the proxy contract 114 may locally consult an internal mapping privilegeMap["pause Transfers"]=ADMIN_ONLY stored within proxy data 132, confirming that the requested operation requires elevated privileges. Responsive to determining that authorization is required, the proxy logic 130 may proceed to retrieve the proxy administrator contract identifier 134, which identifies the proxy administrator contract 116 associated with the proxy contract 114, and, based on the proxy administrator contract identifier 134, query the proxy administrator contract 116 for an administrator identifier. Continuing with the above example, the proxy logic 130 of Proxy_Client_A may retrieve its proxy administrator contract identifier 134 pointing to Proxy_Admin_Contract_116, then performs a call getAdmin( ) on Proxy_Admin_Contract_116. Responsive to the query, the proxy administrator logic 140 may be executed to retrieve the administrator identifier 144 for the proxy contract 114 from the proxy administrator data 142, and return the administrator identifier 144 to the proxy contract 114. Continuing with the above example, the proxy administrator logic 140 may return 0xADMN-C001 as the administrator identifier 144, corresponding to Alice_Admin's registered address. Responsive to receiving the administrator identifier 144, the proxy logic 130 may, in turn, compare the requestor identifier 204 received in the execution request 200 with the administrator identifier 144 obtained from the proxy administrator contract 116 to determine whether they match or otherwise correspond to one another, and, in turn, whether the requestor is authorized to invoke execution of the implementation logic 120. This determination may include evaluating whether the identifiers match or otherwise correspond to one another. Continuing with the above example, Proxy_Client_A may compare the requestor identifier 204 (0xADMN-C001) against the retrieved administrator identifier 144 (0xADMN-C001) and determine that they match, confirming administrative privileges. Responsive to a determination that they match or otherwise correspond, the proxy logic 130 may enable execution of the process using the implementation logic 120 of the implementation contract 112. This may include providing an indication that the requestor has sufficient authority to invoke execution of the implementation logic 120, such that the implementation contract 112 proceeds with execution of the implementation logic 120 to fulfill the request of the proxy contract 114. Continuing with the above example, the proxy logic 130 may invoke a delegate-style call delegatecall Impl_TokenTransfer_V2.pauseTransfers( ) which executes the implementation logic 120 while writing to Proxy_Client_A's local storage, setting paused=true and emitting an event TransfersPaused(Proxy_Client_A, block.timestamp). Responsive to a determination that they do not match or otherwise correspond, the proxy logic 130 may disable or otherwise inhibit execution of the process using the implementation logic 120 of the implementation contract 112. This may include providing an indication that the requestor does not have sufficient authority to invoke execution of the implementation logic 120, such that the implementation contract 112 does not proceed with execution of the implementation logic 120 to fulfill the request of the proxy contract 114. Continuing with the above example, if the requestor identifier 204 were 0xUSER-7788, the proxy logic 130 would revert with an error message "Unauthorized caller: requires admin privileges", thereby preventing the execution from proceeding. Such a process may be conducted for various execution requests from various users to ensure that implementation logic is invoked when sufficient privileges or similar requirements are satisfied.

In some embodiments, a user 104 submits an administrator update request 210 that is intended for processing by the proxy administrator contract 116, which may, for example, cause execution of an update to an administrator identifier 144 stored within proxy administrator data 142 of the proxy administrator contract 116. As illustrated, the administrator update request 210 may include administrator request credentials 212 (e.g., a requestor identifier 213), which can be employed to verify privileges required for update of the administrator identifier 144, and a requestor administrator identifier 214, which is intended for storage in place of the current administrator identifier 144.

In an example embodiment, the user 104 may submit an administrator update request 210 to the proxy administrator contract 116 for processing. Continuing with the above example, following a key-rotation event, Alice_Admin (0xADMN-C001) may submit an administrator update request 210 to Proxy_Admin_Contract_116, providing administrator-request credentials 212 (including her address 0xADMN-C001 and signature sig_Alice_2025) and specifying a requestor administrator identifier 214 equal to the new admin address 0xADMN-C002. The proxy administrator contract 116 may execute corresponding proxy administrator logic 140 to retrieve the administrator identifier 144 from the proxy administrator data 142, and compare the requestor identifier 213 received in the administrator update request 210 with the administrator identifier 144 retrieved, to determine if they match or otherwise correspond to one another. Responsive to a determination that they match or otherwise correspond, the proxy administrator logic 140 may execute a process to update the proxy administrator data 142 to store the requestor administrator identifier 214 in place of the administrator identifier 144. Continuing with the above example, Proxy_Admin_Contract_116 may verify that 0xADMN-C001 matches the stored administrator identifier 144, passes a multi-signature policy check, and writes the new identifier 0xADMN-C002 into proxy administrator data 142, replacing the prior record. It then emits an event AdminRotated(0xADMN-C001, 0xADMN-C002, block. timestamp). As a result, the proposed requestor administrator identifier 214 may now be stored as the current administrator identifier 144 for use moving forward. Responsive to a determination that they do not match or otherwise correspond, the proxy administrator logic 140 may disable, inhibit, or otherwise refuse to update the proxy administrator data 142 to store the requestor administrator identifier 214 in place of the administrator identifier 144. As a result, the current administrator identifier 144 may remain in storage for use moving forward. Such a process may be conducted for various administrator update requests from various users to enable update of the administrator identifier over time. Continuing with the above example, any subsequent privileged execution requests issued to proxies referencing Proxy_Admin_Contract_116 may now recognize 0xADMN-C002 as the valid administrator, and calls signed by 0xADMN-C001 would revert with "Invalid administrator credentials".

FIG. 3 is a diagram that illustrates a distributed execution environment implementation-validation architecture 300 in accordance with one or more embodiments. As illustrated, the implementation-validation architecture 300 may include an implementation contract 112, a proxy contract 114, and an implementation validator 106. For example, in a custodial platform operated by CompanyX, a validator component Impl_Validator_106 may be employed to monitor and validate each new implementation contract that provides executable logic—such as Impl_TokenTransfer_V2—before any proxy is allowed to reference it.

In some embodiments, the implementation validator 106 is operable to determine whether the implementation contract 112 (including its implementation logic 120) is valid and, if so, record an implementation credential 128 in the implementation validation data 124 of implementation data 122 of the implementation contract 112, or in another location within the environment 100, such as in a validation log maintained by the implementation validator 106. Continuing with the example, Impl_Validator_106 may retrieve the bytecode hash of Impl_TokenTransfer_V2, compute a reference hash 0x9af4 . . . e21c, and confirm that it matches the audited source hash stored in CompanyX's registry. Upon successful validation, Impl_Validator_106 may write an corresponding implementation credential 128 to the contract's on-chain storage: {validated=true, validator="Impl_Validator_106", sig="VAL_SIG_2025", timestamp=1735600000}. This record is stored in implementation-validation data 124, which may enable any proxy or administrator to query the validation status directly on-chain.

In an example embodiment, the user 104 may submit an execution request 300 to the proxy contract 114 for processing. The proxy contract 114 may execute corresponding proxy logic 130 to analyze the request 300. Based on an implementation-contract identifier 136 stored in proxy data 132, the proxy logic 130 may determine that processing of the request 300 relies on execution of the implementation logic 120 of the implementation contract 112. Continuing with the example, Proxy_Client_A reads from proxy data 132 that its implementation-contract identifier 136 is set to Impl_TokenTransfer_V2. Responsive to that determination, the proxy contract 114 may determine that the implementation logic 120 requires validation prior to invoking execution of the implementation logic 120. This may be, for example, based on a standard pre-execution validation procedure of the proxy contract 114 or a parameter associated with the specific implementation contract 112, such as a pre-execution validation label associated with the implementation-contract identifier 136. Continuing with the example, Proxy_Client_A may check an internal mapping validationRequired["transferAssets"]=true, confirming that validation of the implementation logic is required before its use.

Responsive to determining that pre-execution validation is required, the proxy logic 130 may query the implementation contract 112 for its implementation credential (e.g., via a validation query 302). For instance, Proxy_Client_A executes a read-only call getValidationCredential( ) on Impl_TokenTransfer_V2, which returns a JSON-encoded structure {validated=true, validator="Impl_Validator_106", sig="VAL_SIG_2025"}. Responsive to the query, the implementation contract 112 may retrieve the implementation credential 128 (e.g., from the implementation validation data 124 of implementation data 122 within the implementation contract 112), and return the implementation credential 128 to the proxy contract 114 (e.g., via a validation query response 304). Responsive to receiving the implementation credential 128, the proxy logic 130 may, in turn, assess the implementation credential 128 for validity, for example by verifying a signature, hash, or flag stored within the credential, to determine whether the implementation contract 112 (including its implementation logic 120) is valid. Continuing with the example, the proxy may verify the validator signature VAL_SIG_2025 against the public key of Impl_Validator_106 and confirm that the credential is current (timestamp<expiry), thereby validating the implementation logic.

Responsive to a determination that the implementation credential 128 is valid, the proxy logic 130 may determine that the implementation contract 112 (including its implementation logic 120) is valid, and, in turn, enable use of the implementation contract 112. This may include initiating or otherwise enabling execution of the process using the implementation logic 120 of the implementation contract 112. This may include submission of a corresponding execution request to implementation contract 112, such that it proceeds with execution of the implementation logic 120 to fulfill the request of the proxy contract 114. Continuing with the example, Proxy_Client_A may then perform a delegatecall Impl_TokenTransfer_V2.transferAssets( . . . ), causing execution of the verified logic while writing state to the proxy's local storage. Responsive to a determination that the implementation credential 128 is not valid, the proxy logic 130 may determine that the implementation contract 112 (including its implementation logic 120) is not valid, and, in turn, disable or otherwise inhibit use of the implementation contract 112. This may include disabling or otherwise inhibiting the execution of the process using the implementation logic 120 of the implementation contract 112. This may include not requesting (e.g., suppressing or withholding a request for) execution of the implementation logic 120 to fulfill the request of the proxy contract 114, such that the implementation contract 112 does not proceed with execution of the implementation logic 120 to fulfill the request of the proxy contract 114. Continuing with the example, if the returned credential indicated {validated=false} or an invalid signature, the proxy logic 130 may revert the transaction with the message "Implementation not validated: access denied", preventing execution of untrusted logic. Such a process may be conducted for various execution requests from various users to ensure that implementation contracts (and their implementation logic) are invoked only when they are valid or meet other validation or governance requirements. In this example manner, all future proxy operations automatically enforce on-chain validation without requiring off-chain audits prior to invocation.

In some embodiments, validation serves as a threshold or prerequisite condition for performing certain privileged operations within the distributed execution environment 100. Such operations may include, for example, utilization of a targeted implementation contract 112, such as execution of the implementation logic 120, upgrading an implementation contract identifier 136 referenced by a proxy contract 114 to identify the implementation contract 112, modification of administrative parameters, or activation of new functionality. In these cases, the proxy contract 114 or an associated validator component may require that the targeted implementation contract 112 be validated on-chain—e.g., through verification of a valid implementation credential 128—before the operation can proceed. This may ensure that upgrades or configuration changes occur only when the referenced implementation contract has been authenticated and approved by an authorized validator, preventing inadvertent or malicious replacement with unverified logic. Continuing with the above example, before Proxy_Client_A updates its implementation contract identifier 136 from Impl_TokenTransfer_V2 to a proposed new version Impl_TokenTransfer_V3, the proxy logic 130 may first check that Impl_TokenTransfer_V3 holds a valid implementation credential 128 issued by Impl_Validator_106. If the validation check succeeds, Proxy_Client_A may authorize the identifier update; otherwise, the proxy logic 130 may revert the transaction with an error such as "Upgrade denied: unvalidated implementation contract". In this manner, validation functions as a universal control gate across both execution and upgrade pathways, maintaining deterministic security and consistency across the distributed ledger. In some embodiments, such a validation may be performed in coordination with a compatibility check and serve as a threshold for upgrades or other processes, such as those described herein with respect to at least FIGS. 3 and 6.

FIG. 4 is a diagram that illustrates a distributed execution environment proxy-upgrade validation architecture 400 in accordance with one or more embodiments. As illustrated, the proxy-upgrade validation architecture 400 may include an implementation contract 112, a proxy contract 114, and an upgrade validator 108. For example, in the example CompanyX deployment, the proxy contract Proxy_Client_A_114 may delegate execution to an implementation contract Impl_TokenTransfer_V2, and an upgrade validator Upgrade_Validator_108 may evaluate any proposal to replace that reference with a new version, Impl_TokenTransfer_V3.

In some embodiments, the upgrade validator 108 is operable to determine whether an implementation contract 112 (including its implementation logic 120) is appropriate for use with a proxy contract (e.g., is compatible or valid) and, if so, enable an upgrade of the proxy contract 114 to store a reference to the implementation contract 112 (e.g., in its implementation contract identifiers 136). Where the upgrade includes consideration of utilizing a "new" implementation contract 112 in place of a current implementation contract 112 referenced in its implementation contract identifiers 136, if an upgrade is allowed, it may include replacing the reference to the current implementation contract 112 in the implementation contract identifiers 136 with a reference to the new implementation contract 112, such that future calls are routed to the "new" implementation contract 112 instead of the current implementation contract 112. Although some embodiments are described in the context of a discrete upgrade validator 108, the upgrade validator 108 may be implemented through various channels. For example, a proxy administrator contract 116 may include proxy administrator logic 140, or other executable contracts or modules may include logic, that is operable to execute the functionality of the described upgrade validator 108. In the CompanyX example, Upgrade_Validator_108 may execute as an on-chain contract under the same administrative authority as Proxy_Admin_116. When a new candidate version Impl_TokenTransfer_V3 is proposed, the validator examines its metadata and credentials to ensure that it is compatible with existing proxies and validated by Impl_Validator_106.

In an example embodiment, the user 104 may submit an implementation upgrade request 400 (e.g., including a proxy contract identifier 402, a current implementation contract identifier 404, and candidate implementation contract identifier 406) to the upgrade validator 108 for processing. The proxy contract identifier 402 may correspond to the proxy contract 114, the current implementation contract identifier 404 may correspond to a "current" implementation contract 112 referenced in the proxy contract's implementation contract identifiers 136, and the candidate implementation contract identifier 406 may correspond to a "new" implementation contract 112 to be referenced in the proxy contract's implementation contract identifiers 136, in place of the current implementation contract 112. For example, Alice_Admin (0xADMN-C002) submits an upgrade request 400 to Upgrade_Validator_108 with proxyID=Proxy_Client_A_114, currentImpl=Impl_TokenTransfer_V2, and candidateImpl=Impl_TokenTransfer_V3, attaching a digital signature sig_Admin_Upgrade_2025.

The upgrade validator 108 may analyze the request 400. Based on the proxy contract identifier 402, the upgrade validator 108 may obtain proxy parameters for the proxy contract 114. This may include retrieving them from an accessible location on the platform 102 (e.g., in a parameter store of the upgrade validator 108) or from the proxy contract 114. For example, this may include the upgrade validator 108 sending, to the proxy contract 114 (or other entity) a proxy parameter request 408 and receiving a corresponding proxy parameter response 410 with the requested parameter values. Proxy parameters may include various characteristics of the proxy contract 114 or the implementation contract in question that are relevant to determinations of compatibility, such as a compatible contract type for the proxy contract 114 (or the implementation contract 112) or a version number of the current implementation contract 112. Further, based on the candidate implementation contract identifier 406, the upgrade validator 108 may obtain implementation credentials for the implementation contract 112. This may include retrieving implementation credentials for the implementation from an accessible location on the platform 102 (e.g., in a validation log of the implementation validator 106) or from the implementation contract 112. For example, this may include the upgrade validator 108 sending a candidate parameters request 412 to the candidate implementation contract 112 (or other entity) and receiving a corresponding candidate parameters response 414. The response 414 may include responsive candidate parameters that are relevant to determining compatibility or validity, such as implementation metadata, including contract type, a version number or the like, and implementation credentials 128 for the candidate implementation contract 112. In the example, Upgrade_Validator_108 may send getProxyParams(Proxy_Client_A_114) and receives {type: "Token", currentVersion: "2.0"} in response 410. It then queries the candidate contract Impl_TokenTransfer_V3 with getImplementationInfo( ) and receives a candidate-parameters response 414 containing {type: "Token", version: "3.0", credentialHash: "0x9af4 . . . e21c", validator: "Impl_Validator_106", validated: true}.

Responsive to determining that a pre-upgrade compatibility check is required, the upgrade validator 108 may compare the candidate parameters provided in the candidate parameters response 414 to the proxy parameters provided in the response 410. This may include, for example, confirming that the candidate implementation contract 112 has a type that is compatible with the type indicated in the proxy parameters and that the version of the candidate implementation contract 112 is compatible with the current implementation contract 112 (e.g., confirming that the candidate implementation contract 112 is compatible with the version of the current implementation contract 112 indicated in the proxy parameters). If the candidate parameters are determined to satisfy the compatibility requirements, the upgrade validator 108 may determine that the candidate implementation contract 112 is compatible with the proxy contract 114 and, thus, is eligible for reference in place of the current implementation contract 112. In the example, Upgrade_Validator_108 may verify that both contracts share the type "Token" and that the candidate version "3.0" is greater than "2.0". The validator may also confirm that the candidate contract's ABI matches the expected function signatures for transfer Assets( ) and pauseTransfers( ) recording a check-result compatible=true.

Responsive to determining that a pre-upgrade credential validation is required, the upgrade validator 108 may assess the candidate parameters response 414 for valid implementation credentials 128 issued or verified by an implementation validator 106 or other authorized entity. This may include confirming that the candidate parameters response 414 includes valid implementation credentials 128. If the validation is confirmed, the upgrade validator 108 may determine that the candidate implementation contract 112 is valid for reference in place of the current implementation contract 112. In the example, the upgrade validator verifies the credential signature from Impl_Validator_106, checking that credentialHash=0x9af4 . . . e21c matches the validator's audit record and that validated=true. A record credentialVerified=true is stored in the upgrade transaction context.

Responsive to determining that pre-upgrade requirements are satisfied, such as one or both of compatibility and credential validation, the upgrade validator 108 may enable updating the implementation contract identifiers 136 to reference the candidate implementation contract 112 in place of the reference to the current implementation contract 112. As such, future requests may invoke implementation logic 120 of the candidate implementation contract 112 instead of implementation logic of the current implementation contract 112. Responsive to determining that the pre-upgrade requirements are not satisfied, such as one or both of compatibility and credential validation being not satisfied, the upgrade validator 108 may disable or otherwise inhibit updating the implementation contract identifiers 136 to reference the candidate implementation contract 112 in place of the reference to the current implementation contract 112. As such, future requests may continue to invoke implementation logic 120 of the current implementation contract 112. In the example, Upgrade_Validator_108 may authorize the update and emit an on-chain event ImplementationUpgraded (proxy=Proxy_Client_A_114, oldImpl=V2, newImpl=V3, timestamp); the corresponding implementation contract identifier 136 of the proxy data 132 for Proxy_Client_A_114 may then be updated to store Impl_TokenTransfer_V3 as its active implementation. Subsequent user transactions may thus invoke transferAssets( ) on the new version through delegate-calls, while previous calls to the deprecated V2 logic are no longer accepted. If at any point the credential verification or compatibility check had failed (e.g., ABI mismatch or invalid signature), the validator may have reverted with "Upgrade Denied: incompatible or unverified implementation", and the proxy would have retained its existing reference.

Figure 5:
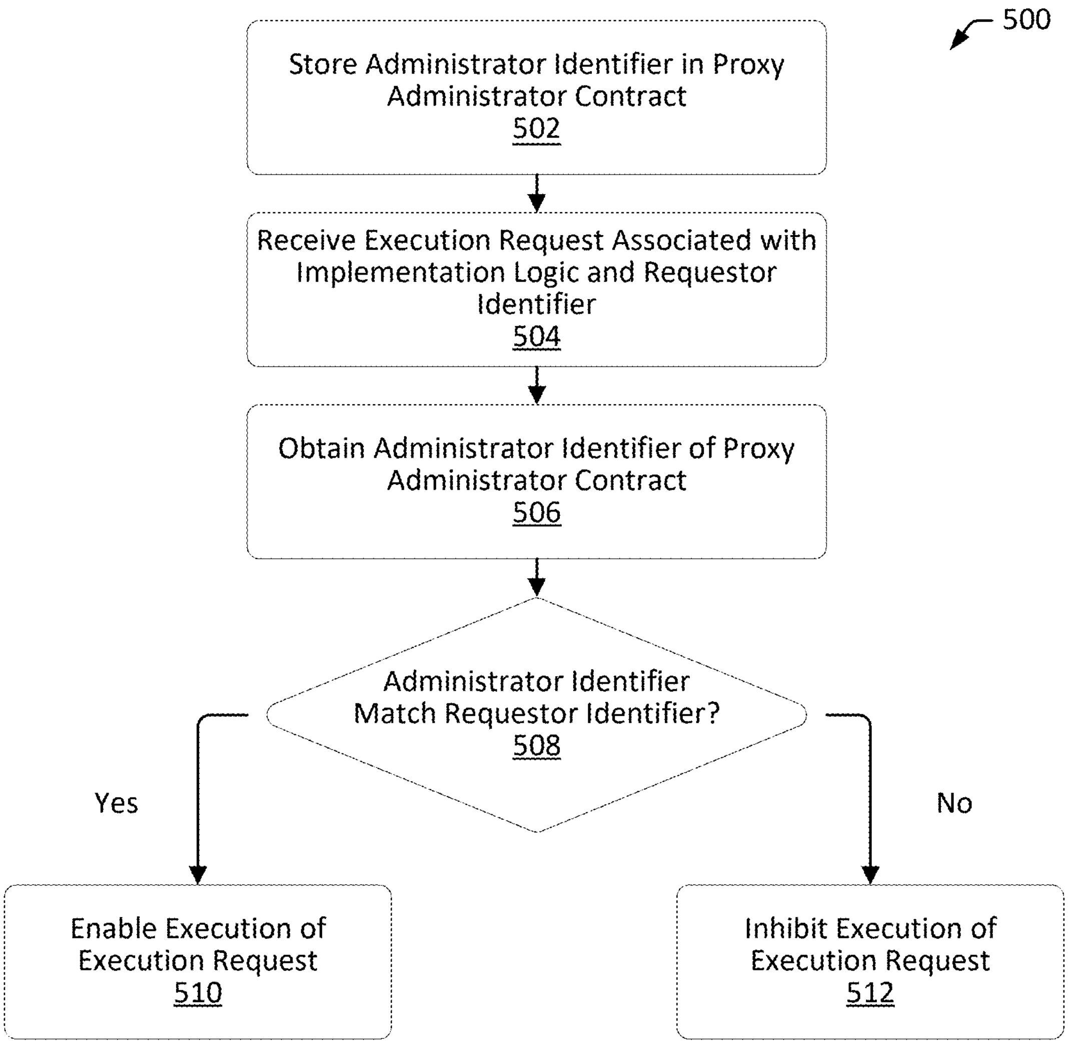
FIG. 5 is a flow diagram that illustrates a method for implementing administrative control over executable contracts in accordance with one or more embodiments.

FIG. 5 is a flow diagram that illustrates a method 500 for implementing administrative control over controlling implementation of executable contracts in accordance with one or more embodiments. Some or all of the procedural elements of method 500 may be performed, for example, by one or more entities of platform 102 or another entity of environment 100. For example, some or all of the operations of method 500 may be performed by executable contracts 111, such as implementation contracts 112, proxy contracts 114, or proxy administrator contracts 116, an implementation validator 106, an upgrade validator 108, a user 104, or other entities, such as similar executable contracts or modules.

In some embodiments, method 500 includes storing administrator identifier in proxy administrator contract (block 502). This may include storing an administrator identifier in proxy data of a proxy administrator contract. For example, this may include storing an administrator contract identifier (0xADMN-C002) as proxy administrator contract identifier 132 of the proxy data 134 of the proxy administrator contract 116 (e.g., Proxy_Admin_Contract_116), as described here (e.g., with regard to at least FIG. 2). Referring to the CompanyX example, during initial system setup, the enterprise administrator ("Alice_Admin") may execute a setAdmin(0xADMN-C002) transaction on Proxy_Admin_Contract_116, which records the administrator identifier 144 in persistent storage for subsequent authorization queries by multiple proxy contracts 114.

In some embodiments, method 500 includes receiving execution request associated with implementation logic and requestor identifier (block 504). This may include a proxy contract receiving a request to execute a process, including a requestor identifier. For example, this may include the proxy contract 114 (Proxy_Client_A) receiving an execution request 200 that includes a request to execute a process that relies on implementation logic 120 of the implementation contract 112 (Impl_TokenTransfer_V2), and including a requestor identifier 204 (0xADMN-C002) in execution request credentials 202 of the execution request 200, as described here (e.g., with regard to at least FIG. 2). Referring to the CompanyX example, the user 104 (Alice_Admin) may initiate the request 200 to call pauseTransfers( ) on the proxy contract 114, digitally signing the transaction as proof of authority. The execution request 200 may include execution-request credentials 202 containing a requestor identifier 204 equal to 0xADMN-C001 and a digital signature sig_Alice_2025 verifying Alice_Admin's authorization. The proxy logic 130 may parse the request, confirming that it references the "pause Transfers" function and that elevated privileges are required.

In some embodiments, method 500 includes obtaining administrator identifier of proxy administrator contract (block 506). This may include a proxy contract determining that privileges are needed to execute the process (or at least a portion of the process) and obtaining an administrator identifier stored in a proxy administrator contract identified by the proxy contract. For example, this may include the proxy contract 114 identifying proxy administrator contract 116 based on the proxy administrator identifier 134 stored in proxy data 132 of the proxy contract 114 identifying the proxy administrator contract 116, and querying the proxy administrator contract 116 for the administrator identifier 144 (0xADMN-C002) stored in the proxy administrator data 142 of the proxy administrator contract 116, where the proxy administrator contract 116 returns the administrator identifier (0xADMN-C002) to the proxy contract 114, as described here (e.g., with regard to at least FIG. 2). Referring to the CompanyX example, the proxy logic 130 may issue a call getAdmin( ) to Proxy_Admin_Contract_116, which responds with 0xADMN-C002 as the stored administrator identifier. The returned value may then be cached by the proxy logic 130 for use in the privilege-comparison stage.

In some embodiments, method 500 includes determining whether administrator identifier matches requestor identifier (block 508). This may include determining whether an administrator identifier obtained from a proxy administrator contract matches a requestor identifier of an execution request. For example, this may include the proxy contract 114 comparing the administrator identifier 144 (0xADMN-C002) to the requestor identifier 204 of (0xADMN-C002) to determine if they match one another-if so, determining that the administrator identifier matches the requestor identifier, and if not, determining that the administrator identifier does not match the requestor identifier, as described here (e.g., with regard to at least FIG. 2). Referring to the CompanyX example, the identifiers match exactly, indicating that the requestor has sufficient administrative authority. If they do not match (e.g., if the requestor identifier was 0xUSER-7788), the proxy logic 130 may determine that the caller is not authorized to execute the administrative function.

In some embodiments, method 500 includes enabling execution of execution request (block 510). This may include, in response to a determination that an administrator identifier matches a requestor identifier, proceeding to invoke the corresponding implementation logic to execute the process. For example, this may include the proxy contract 114, in response to determining that the administrator identifier 144 (0xADMN-C002) matched the requestor identifier 204 (0xADMN-C002) requesting that implementation contract 112 execute corresponding implementation logic 120 to execute the requested process (or a portion of the process), as described here (e.g., with regard to at least FIG. 2). Referring to the CompanyX example, the proxy logic 130 may perform a delegate-style call delegatecall Impl_TokenTransfer_V2.pauseTransfers( ) the implementation logic 120 may then update the proxy's local storage flag paused=true and emits an event TransfersPaused (Proxy_Client_A, block.timestamp). The proxy 114 may relay a success response to the contract management platform 102 and the user 104. In some embodiments, enabling execution of execution request includes updating a reference in a proxy contract to point to the implementation contract (or its implementation logic), thereby directing or otherwise enabling the proxy contract to call for and invoke execution of the implementation contract (and its implementation logic).

In some embodiments, method 500 includes inhibiting execution of execution request (block 512). This may include, in response to a determination that an administrator identifier does not match a requestor identifier, not invoking the corresponding implementation logic to execute the process. For example, this may include the proxy contract 114, in response to determining that the administrator identifier 144 (0xADMN-C002) does not match the requestor identifier 204 (0xUSER-7788), refraining from requesting that implementation contract 112 execute corresponding implementation logic 120 to execute the requested process (or a portion of the process), as described here (e.g., with regard to at least FIG. 2). Referring to the CompanyX example, in such a case, the proxy logic 130 may revert the transaction with an error message "Unauthorized caller: requires admin privileges" or return a structured response {status: denied, reason: "insufficient privileges"}. The implementation logic 120 may remain unexecuted, preserving the current state of the system. In this way, method 500 may ensure that execution of privileged implementation logic occurs only when the caller's credentials match the authorized administrator identifier stored in the proxy administrator contract, thereby enforcing centralized, on-chain administrative control across proxy contracts 114 within the distributed execution environment 100. In some embodiments, inhibiting execution of execution request includes refraining from updating a reference in a proxy contract to point to the implementation contract (or it implementation logic), thereby not directing, or otherwise inhibiting the proxy contract from, calling for and invoking execution of the implementation contract (and its implementation logic).

Accordingly, embodiments of method 500 illustrate a control-plane process that provides centralized administrative control across proxy contracts on a distributed ledger. By externalizing administrative state into a shared proxy administrator contract, the method enables consistent privilege enforcement, rapid key rotation, and atomic configuration changes across multiple proxies. This approach may reduce on-chain transaction costs and avoids configuration drift that can occur when administrative data are maintained separately within each proxy. Variations of the method may use different data structures or identifiers (e.g., cryptographic keys, certificates, or role-based tokens) to represent administrative authority, and may be implemented by various entities, such as governance modules, decentralized autonomous organization (DAO) controllers, or off-chain orchestrators that interface with on-chain administrator contracts. Equivalent operations may be realized in different distributed-ledger environments, including blockchains, directed-acyclic-graph (DAG) networks, or other verifiable execution frameworks that support persistent contract state.

Figure 6:
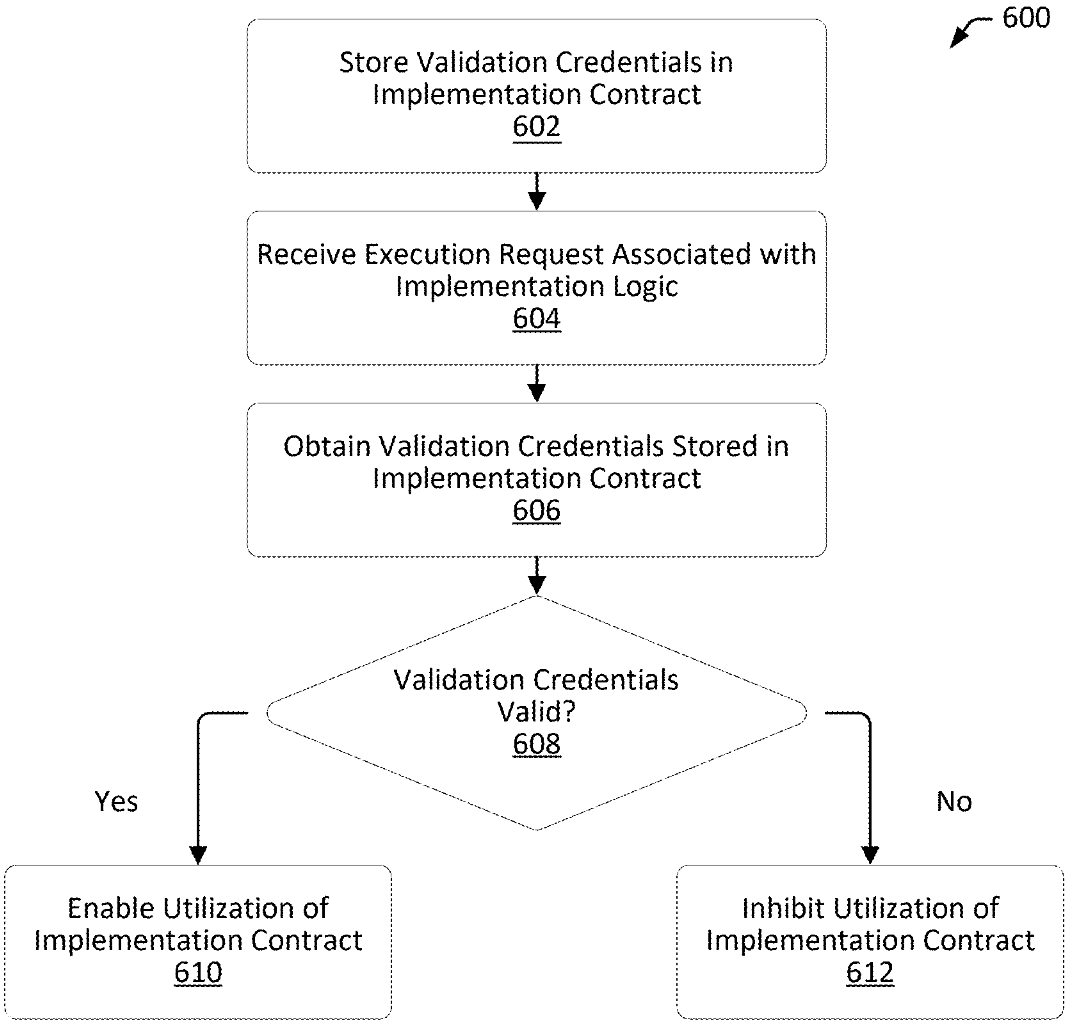
FIG. 6 is a flow diagram that illustrates a method for validated utilization of executable contracts in accordance with one or more embodiments.

FIG. 6 is a flow diagram that illustrates a method 600 for validated utilization of executable contracts in accordance with one or more embodiments. Some or all of the procedural elements of method 600 may be performed, for example, by one or more entities of platform 102 or another entity of environment 100. For example, some or all of the operations of method 600 may be performed by executable contracts 111, such as implementation contracts 112, proxy contracts 114, or proxy administrator contracts 116, an implementation validator 106, an upgrade validator 108, a user 104, or other entities, such as similar executable contracts or modules.

In some embodiments, method 600 includes store validation credentials in implementation contract (block 602). This may include an implementation validator storing validation credentials in an implementation contract. For example, this may include the implementation validator 106 determining whether the implementation contract 112 (including its implementation logic 120) is valid and, if so, recording a corresponding implementation credential 128 in the implementation validation data 124 of implementation data 122 of the implementation contract 112, or in another location within the environment 100, such as in a validation log maintained by the implementation validator 106, as described here (e.g., with regard to at least FIG. 3). In the CompanyX example, the validator contract Impl_Validator_106 may review Impl_TokenTransfer_V2 by computing its bytecode hash 0x9af4 . . . e21c and comparing it to an authorized hash registry. Upon confirmation, it may execute setValidationCredential(true, "Impl_Validator_106", "VAL_SIG_2025"), writing the resulting credential structure {validated: true, validator: "Impl_Validator_106", sig: "VAL_SIG_2025", timestamp: 1735600000} into an implementation credential 128 of the contract's implementation validation data 124. This credential 128 may become an immutable record of validation that other components can query on-chain.

In some embodiments, method 600 includes receiving execution request associated with implementation logic (block 604). This may include a proxy contract receiving a request to execute a process. For example, this may include the proxy contract 114 receiving an execution request 300 to execute a specific function, such as transferAssets( ) and based on an implementation-contract identifier 136 stored in proxy data 132, determining that processing of the request 300 relies on execution of the implementation logic 120 of an implementation contract 112 (Impl_TokenTransfer_V2), and that that the implementation logic 120 requires validation prior to invoking execution of the implementation logic 120, as described here (e.g., with regard to at least FIG. 3). For instance, Proxy_Client_A_114 may receive a user transaction calling transferAssets (0xUSER-7788, 500) and identify Impl_TokenTransfer_V2 as the referenced implementation contract from its stored identifier 136. The proxy logic 130 may recognize from its configuration that "transferAssets" requires a pre-execution validation check.

In some embodiments, method 600 includes obtaining validation credentials stored in implementation contract (block 606). This may include the proxy contract obtaining validation credentials from the implementation contract identified as having implementation logic for executing the process. For example, this may include the proxy contract 114 querying the implementation contract 112 for its implementation credential (e.g., via a validation query 302) and receiving the implementation credentials 128 (e.g., via a validation query response 304), as described here (e.g., with regard to at least FIG. 3). In the CompanyX example, the proxy logic 130 may perform a read-only call getValidationCredential( ) on Impl_TokenTransfer_V2. The implementation contract 112 may respond with the stored credential {validated: true, validator: "Impl_Validator_106", sig: "VAL_SIG_2025"}. The proxy logic 130 may parse and temporarily store this credential for verification.

In some embodiments, method 600 includes determining whether validation credentials are valid (block 608). This may include the proxy contract assess the obtaining validation credentials for validity. For example, this may include the proxy contract 114 assessing the implementation credential 128 for validity, for example, by verifying a signature, hash, or flag stored within the credential, to determine whether the implementation contract 112 (including its implementation logic 120) is valid, as described here (e.g., with regard to at least FIG. 3). For instance, Proxy_Client_A_114 may verify the digital signature "VAL_SIG_2025" using the known public key of Impl_Validator_106 and confirm that the credential's hash matches the expected code hash 0x9af4 . . . e21c. Because the credential indicates {validated: true} and the timestamp remains within its defined validity window, the proxy logic 130 may determine that the implementation contract 112 is valid.

In some embodiments, method 600 includes enabling utilization of implementation contract (block 610). This may include responsive to determining that the implementation credentials for the implementation contract are valid, enabling utilization of the implementation contract, such as by way of execution of the implementation contract or by way of use in updating an implementation contract identifier, as described here. For example, this may include, responsive to the proxy contract determining that the implementation credentials 128 for the implementation contract 112 are valid, requesting that implementation contract 112 execute corresponding implementation logic 120 to execute the requested process (or a portion of the process) to fulfill the request of the proxy contract 114, as described here (e.g., with regard to at least FIG. 3). In the CompanyX example, after successful validation, the proxy logic 130 may invoke a delegate-style call delegatecall Impl_TokenTransfer_V2.transferAssets (0xUSER-7788, 500). The implementation logic 120 may execute using the proxy's local state, deducting 500 units from Proxy_Client_A_114's ledger entry and emitting an event TransferExecuted (from=0xUSER-7788, amount=500, validator="Impl_Validator_106").

In some embodiments, method 600 includes inhibiting utilization of implementation contract (block 612). This may include responsive to determining that the implementation credentials for the implementation contract are not valid, inhibiting utilization of the implementation contract, such as by way of not directing or allowing execution of the implementation contract or by way of not updating an implementation contract identifier, as described here. For example, this may include, responsive to the proxy contract determining that the implementation credentials 128 for the implementation contract 112 are not valid, refraining from requesting that implementation contract 112 execute corresponding implementation logic 120 to execute the requested process (or a portion of the process) to fulfill the request of the proxy contract 114, as described here (e.g., with regard to at least FIG. 3). For instance, if the returned credential indicated {validated: false} or contained an invalid signature, the proxy logic 130 may revert with an error "Validation failed: unverified implementation", preventing the function call from proceeding. In such a case, the proxy may retain its current configuration and may log the denial event ValidationCheckFailed(proxy-Proxy_Client_A_114, impl=Impl_TokenTransfer_V2, timestamp) for on-chain auditing. This may ensure that unvalidated or tampered implementation logic cannot be executed within the environment 100, maintaining deterministic integrity and regulatory assurance for all subsequent operations.

Accordingly, embodiments of method 600 illustrate a validated-implementation process in which contracts on a distributed ledger are authenticated prior to utilization, ensuring that only verified and trusted logic can be executed or referenced by a proxy. By incorporating validation credentials directly within each implementation contract, the process may allow deterministic, on-chain verification without reliance on off-chain review tools. This may enhance security, integrity, and auditability of executable logic across a contract ecosystem. Variations of the method may include different types of validation data-such as hash digests, digital signatures, zero-knowledge proofs, or multi-party attestations- or may employ multiple validator entities working independently or in quorum. The same framework may be applied in other distributed-execution systems, including permissioned ledgers, hybrid cloud-ledger deployments, or cross-chain environments that require verifiable validation prior to execution or upgrade.

Figure 7:
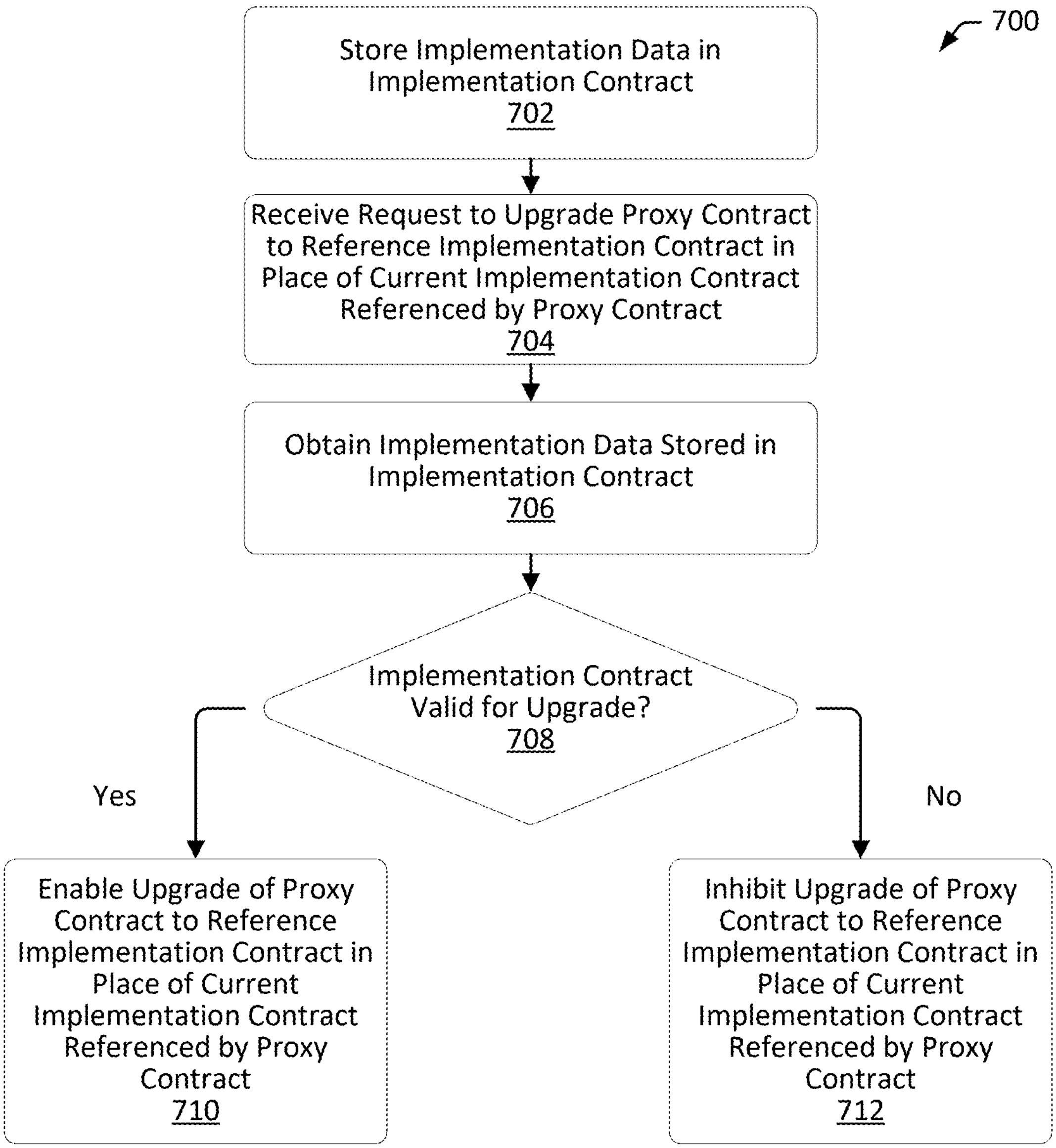
FIG. 7 is a flow diagram that illustrates a method for validated upgrading of executable contracts in accordance with one or more embodiments.

FIG. 7 is a flow diagram that illustrates a method 700 for validated upgrading of executable contracts in accordance with one or more embodiments. Some or all of the procedural elements of method 700 may be performed, for example, by one or more entities of platform 102 or another entity of environment 100. For example, some or all of the operations of method 700 may be performed by executable contracts 111, such as implementation contracts 112, proxy contracts 114, or proxy administrator contracts 116, an implementation validator 106, an upgrade validator 108, a user 104, or other entities, such as similar executable contracts or modules.

In some embodiments, method 700 includes storing implementation data in implementation contract (block 702). This may include storing implementation validation data, such as implementation contact metadata and credentials, in an implementation contract. For example, this may include an implementation contract 112 (or another entity) storing implementation metadata 126 and implementation credentials 128 in implementation validation data 124 of implementation data 122 of the implementation contract 112, as described here (e.g., with regard to at least FIG. 4). In the CompanyX example, the contract Impl_TokenTransfer_V3 may store metadata {type: "Token", version: "3.0"} and a validator-signed credential {validated: true, validator: "Impl_Validator_106", sig: "VAL_SIG_V3"} in its on-chain storage. These records may be written when Impl_Validator_106 executes setValidationCredential( ) following successful review of the new logic.

In some embodiments, method 700 includes receiving a request to upgrade proxy contract to reference implementation contract in place of current implementation contract referenced by proxy contract (block 704). This may include an upgrade validator, or other entity, receiving an implementation upgrade request, which identifies the proxy contract, a current implementation contract, and a candidate implementation for replacing the reference to the current implementation contract in the proxy contract. For example, this may include the upgrade validator 108 receiving an implementation upgrade request 400 including a proxy contract identifier 402, a current implementation contract identifier 404, and candidate implementation contract identifier 406. The proxy contract identifier 402 may correspond to the proxy contract 114, the current implementation contract identifier 404 may correspond to a current implementation contract 112 referenced in the proxy contract's implementation contract identifiers 136, and the candidate implementation contract identifier 406 may correspond to a new implementation contract 112 to be referenced in the proxy contract's implementation contract identifiers 136, in place of the current implementation contract 112, as described here (e.g., with regard to at least FIG. 4). For instance, administrator Alice_Admin may submit an upgrade request to Upgrade_Validator_108 identifying Proxy_Client_A_114 as proxy 402, Impl_TokenTransfer_V2 as current 404, and Impl_Token_Transfer_V3 candidate 406, along with an authenticated signature sig_Admin_Upgrade_2025.

In some embodiments, method 700 includes obtaining implementation data stored in implementation contract (block 706). This may include retrieving implementation credentials for the implementation contract from an accessible location on the platform (e.g., in a validation log of the implementation validator 106) or from the implementation contract itself. For example, this may include the upgrade validator 108 sending a candidate parameters request 412 to the candidate implementation contract 112 and receiving a corresponding candidate parameters response 414. The response 414 may include candidate implementation contract parameters that are relevant to determining compatibility or validity, such as implementation metadata, including contract type, a version number, any other metadata required to determine contract compatibility, or the like, and implementation credentials 128 for the candidate implementation contract 112, as described here (e.g., with regard to at least FIG. 4). In the example, Upgrade_Validator_108 may send getImplementationInfo( ) to Impl_TokenTransfer_V3 and receive {type: "Token", version: "3.0", credentialHash: "0xAA44 . . . EF12", validator: "Impl_Validator_106", validated: true} in response 414. The validator may cache these parameters for subsequent compatibility and credential checks.

In some embodiments, method 700 includes determining whether implementation contract is valid for upgrade (block 708). This may include comparing the candidate implementation contract parameters obtained to corresponding parameters for the proxy contract or the candidate implementation contract to determine whether the implementation contract is suitable for use in upgrading the proxy contract. For example, this may include the upgrade validator 108 obtaining, proxy parameters for the proxy contract 114, such as a compatible contract type for the proxy contract 114 or a version number of the current implementation contract 112, comparing these with corresponding parameters of the new implementation contract 112, such as the contract type and version number for the candidate implementation contract 112 to determine whether the candidate implementation contract 112 is compatible for use in the proxy contract 114, in place of the current implementation contract 112, as described here (e.g., with regard to at least FIG. 4). In some embodiments, where valid credentials are required for validating an implementation contract for use in updating a proxy contract, determining whether implementation contract is valid for update may include assessing implementation credentials of the candidate implementation contract to confirm its validity. For example, this may include the upgrade validator 108 checking the implementation credentials 128 of the new implementation contract 112 to confirm whether they are valid. Where candidate implementation contract compatibility is required, it may be determined that the implementation contract is valid for update responsive to determining that the candidate implementation contract 112 is compatible for use in the proxy contract 114, in place of the current implementation contract 112. Where candidate implementation contract validation is required, it may be determined that the implementation contract is valid for upgrade responsive to determining that the implementation credentials 128 for the candidate implementation contract 112 are valid. Where candidate implementation contract compatibility and validation is required, it may be determined that the implementation contract is valid for upgrade responsive to determining that the candidate implementation contract 112 is compatible for use in the proxy contract 114, in place of the current implementation contract 112 and that the implementation credentials 128 for the candidate implementation contract 112 are valid, as described here (e.g., with regard to at least FIG. 4). In the CompanyX example, Upgrade_Validator_108 may compare the proxy parameters {type: "Token", currentVersion: "2.0"} from Proxy_Client_A_114 against the candidate parameters {type: "Token", version: "3.0"}. The validator may confirm that the type matches and the version has incremented, satisfying compatibility. It may also verify the credential signature "VAL_SIG_V3" using the public key of Impl_Validator_106 and confirm the credential's "validated: true" flag. Both checks may succeed, leading to a result validForUpgrade=true.

In some embodiments, method 700 includes enabling upgrade of proxy contract to reference implementation contract in place of current implementation contract referenced by proxy contract (block 710). This may include, in response to determining that the candidate implementation contract is valid for upgrade, referencing the candidate implementation contract in the proxy contract (e.g., in place of the current implementation contract). For example, in response to the upgrade validator 108 determining that the candidate implementation contract 114 is valid for upgrade, modifying the implementation contract identifiers 136 of the proxy contract 114 to reference the candidate implementation contract 114, in place of the current implementation contract 114, as described here (e.g., with regard to at least FIG. 4). Continuing the example, Upgrade_Validator_108 may execute an on-chain call updateImplementation (Proxy_Client_A_114, Impl_TokenTransfer_V3). The proxy data 132 for Proxy_Client_A_114 may be upgraded to replace its implementation identifier from V2 to V3, and the transaction emits ImplementationUpgraded (proxy-"Proxy_Client_A_114", old="Impl_TokenTransfer_V2", new-"Impl_TokenTransfer_V3", validator="Upgrade_Validator_108", timestamp=1735601000). Subsequent user requests may be automatically routed to the V3 logic.

In some embodiments, method 700 includes inhibiting upgrade of proxy contract to reference implementation contract in place of current implementation contract referenced by proxy contract (block 712). This may include, in response to determining that the candidate implementation contract is not valid for upgrade, refraining from referencing the candidate implementation contract in the proxy contract (e.g., in place of the current implementation contract). For example, in response to the upgrade validator 108 determining that the candidate implementation contract 114 is not valid for upgrade, it may not modify the implementation contract identifiers 136 of the proxy contract 114 to reference the candidate implementation contract 114, instead, leaving the reference to the current implementation contract 114, as described here (e.g., with regard to at least FIG. 4). In the CompanyX example, if Impl_TokenTransfer_V3 had returned {validated: false} or a mismatched type (e.g., "Oracle"), the validator would revert the transaction with "Upgrade denied: incompatible or unverified implementation," the proxy's data 132 may continue to point to Impl_TokenTransfer_V2, and a denial event UpgradeAttemptFailed (proxy="Proxy_Client_A_114", candidate="Impl_TokenTransfer_V3", reason="invalid credential") may be emitted. This may ensure that unvalidated or incompatible upgrades cannot alter production contract references within the environment 100.

Accordingly, embodiments of method 700 illustrate a validated-upgrade process that ensures proxy contracts are linked only to implementation contracts that are both compatible and validated. The method may allow upgrades to occur safely and atomically, minimizing risk of memory corruption or functional mismatch. This architecture may support predictable evolution of deployed smart-contract systems while preserving integrity of stored data. Variations of the method may use alternative compatibility criteria (e.g., contract-type matching, interface-schema comparison, or ABI verification), may include additional approval stages from governance modules, or may be executed by distinct upgrade-validator components operated by different organizations. The same upgrade-validation techniques may be adapted to heterogeneous computing environments, including multi-chain networks, enterprise distributed-ledger platforms, or modular service architectures that employ upgradeable code components under controlled governance.

The methods and architectures described with respect to FIGS. 2-7 may provide an integrated framework for secure, verifiable, and upgradeable management of executable contracts within distributed-ledger environments. The control-plane method may ensure unified administrative governance across large groups of proxy contracts, the validation method may provide deterministic on-chain verification of implementation integrity, and the upgrade-validation method may ensure compatibility and authenticity during contract evolution. These processes may enable distributed applications to operate with improved security, operational efficiency, and auditability, while reducing the risk of unauthorized logic, inconsistent configurations, or corrupted state. Variations of the framework may incorporate different data models, consensus mechanisms, or governance entities, and may be applied across diverse ledger types—including permissioned blockchains, hybrid or consortium networks, and decentralized-autonomous governance systems—to achieve consistent, verifiable coordination of smart-contract (or similar executable contract) behavior throughout its lifecycle.

Figure 8:
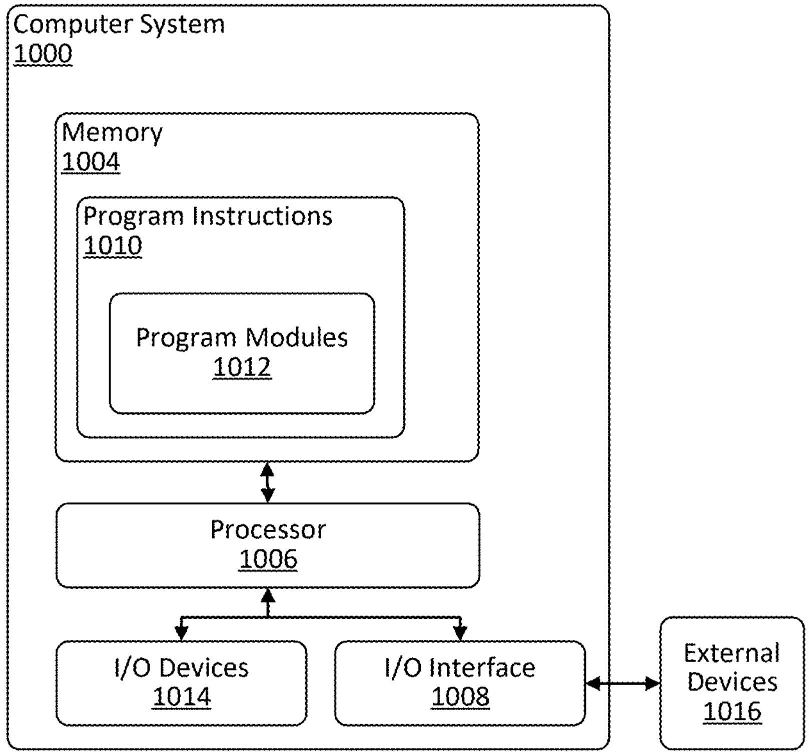
FIG. 8 is a block diagram that illustrates a computing system in accordance with one or more embodiments.

FIG. 8 is a block diagram that illustrates a computing system 1000 in accordance with one or more embodiments. The system 1000 may include a memory 1004, a processor 1006, and an input/output (I/O) interface 1008. The memory 1004 may include non-volatile memory (e.g., flash memory, read-only memory (ROM), programmable ROM (PROM), erasable PROM (EPROM), electrically erasable PROM (EEPROM)), volatile memory (e.g., random access memory (RAM), static RAM (SRAM), synchronous dynamic RAM (SDRAM)), or bulk storage (e.g., CD-ROM, DVD-ROM, or hard drives). The memory 1004 may include a non-transitory computer-readable storage medium having program instructions 1010 stored thereon. The program instructions 1010 may include one or more program modules 1012 that are executable by the processor 1006 to cause the system 1000 to perform one or more functional operations described herein, such as those associated with components of the platform 102 or another entity of environment 100, such as executable contracts 111, e.g., implementation contracts 112, proxy contracts 114, and proxy administrator contracts 116, an implementation validator 106, an upgrade validator 108, a user 104, or other entities, such as similar executable contracts or modules.

The processor 1006 may include one or more processors capable of executing program instructions (e.g., program modules 1012) to perform logical, arithmetic, or I/O operations. The processor 1006 may include a single processing unit or multiple processing cores, each of which may include one or more logical or physical processors. In some embodiments, parallel processing may be used to perform operations concurrently across multiple segments or submodules, for example, by distributing segment-level prompt generation or code inference tasks across cores.

The I/O interface 1008 may provide an interface for communication with one or more I/O devices 1014, such as a keyboard, mouse, touchscreen, or electronic display configured to present a graphical user interface (GUI). The I/O devices 1014 may include one or more user-input devices and may be connected to the I/O interface 1008 via wired (e.g., Ethernet) or wireless (e.g., Wi-Fi, Bluetooth) connections. Additionally, the I/O interface 1008 may enable communication with external systems 1016, such as remote servers, cloud services, or networked development environments. In some embodiments, the I/O interface 1008 may include a transceiver or antenna to support wireless communication with external data sources or client devices, enabling remote execution or review of the MCCS workflow and outputs.

Further modifications and alternative embodiments of various aspects of the disclosure will be apparent to those skilled in the art in view of this description. Accordingly, this description is to be construed as illustrative only and is intended to teach the general manner of carrying out the embodiments. The forms of the embodiments shown and described here are examples only. Elements and materials may be substituted for those illustrated and described here; parts and processes may be reversed, combined, omitted, or modified; and certain features may be utilized independently, all as would be apparent to one skilled in the art. The order of operations may vary, and portions of the described processes may be implemented in software, hardware, or a combination thereof, including by one or more of the processors, modules, or applications described in this disclosure.

As used throughout this application, the word "may" is used in a permissive sense (meaning having the potential to), rather than the mandatory sense (meaning must). The words "include," "including," and "includes" mean including, but not limited to. As used throughout this application, the singular forms "a," "an," and "the" include plural referents unless the context clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and at least in part on data B, unless the context clearly indicates otherwise. As used throughout this application, the term "from" does not limit the associated operation to being directly from. Thus, for example, receiving an item "from" an entity may include receiving the item directly from the entity or indirectly from the entity (e.g., by way of an intermediary entity). As used throughout this application, the term "to" does not limit the associated operation to being directly to. Thus, for example, transmitting an item "to" an entity may include transmitting the item directly to the entity or indirectly to the entity (e.g., by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special-purpose computer or a similar special-purpose electronic processing/computing device. In the context of this specification, a special-purpose computer or similar special-purpose electronic processing/computing device is capable of manipulating or transforming signals, typically represented as physical, electronic, or magnetic quantities within memories, registers, or other information storage devices, transmission devices, or display devices of the special-purpose computer or similar special-purpose electronic processing/computing device. Headings and section titles used throughout this disclosure are provided for organizational clarity and convenience of reference only and are not intended to limit the scope of the disclosure or the claimed invention In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading by virtue of the way in which those terms are used in other materials incorporated by reference.

The techniques described may be further clarified and understood by the following listings of example embodiments:

Administrative control over executable contracts:

1. A computer-implemented method for implementing administrative control over executable contracts, the method comprising:
   - storing, in a proxy administrator contract stored on a distributed ledger, an administrator identifier;
   - storing, in a proxy contract stored on the distributed ledger:
     - a proxy administrator contract identifier corresponding to the proxy administrator contract; and
     - an implementation identifier corresponding to an implementation contract stored on the distributed ledger and comprising implementation logic;
   - receiving, by the proxy contract, an execution request comprising:
     - a request for execution of a process that relies on execution of the implementation logic of the implementation contract; and
     - execution request credentials comprising a requestor identifier;

querying, by the proxy contract based on the proxy administrator contract identifier, the proxy administrator contract to obtain the administrator identifier;

determining, by the proxy contract, that the requestor identifier corresponds to the administrator identifier; and enabling, based on determining that the requestor identifier corresponds to the administrator identifier, execution of the process using the implementation logic of the implementation contract.

2. The method of embodiment 1, further comprising:

receiving, by the proxy contract, a second execution request comprising:

a second request for execution of a second process that relies on execution of the implementation logic of the implementation contract; and second execution request credentials comprising a second requestor identifier;

querying, by the proxy contract based on the proxy administrator contract identifier, the proxy administrator contract to obtain the administrator identifier;

determining, by the proxy contract, that the second requestor identifier does not correspond to the administrator identifier; and inhibiting, based on determining that the second requestor identifier does not correspond to the administrator identifier, execution of the second process using the implementation logic of the implementation contract.

3. The method of embodiment 1 or 2, further comprising:

receiving, by the proxy administrator contract, an administrator update request comprising:

the administrator identifier; and admin request credentials; and determining that the admin request credentials are sufficient to enable update of the administrator identifier of the proxy administrator contract, wherein the storing of the identifier in the proxy administrator contract is conducted responsive to determining that the admin request credentials are sufficient to enable update of the administrator identifier of the proxy administrator contract.

4. The method of embodiment 3, further comprising:

receiving, by the proxy administrator contract, a second administrator update request comprising:

a second administrator identifier; and second administrator request credentials; and determining that the second administrator request credentials are not sufficient to enable update of the administrator identifier of the proxy administrator contract; and inhibiting storing of the second administrator identifier in the proxy administrator contract responsive to determining that the second administrator request credentials are not sufficient to enable update of the administrator identifier of the proxy administrator contract.

5. The method of any one of embodiments 1-4, further comprising:

receiving, by the proxy administrator contract, an administrator update request comprising:

a second administrator identifier; and second admin request credentials; and determining that the second administrator request credentials are sufficient to enable update of the administrator identifier of the proxy administrator contract; and storing the second administrator identifier in the proxy administrator contract in place of the administrator identifier responsive to determining that the second administrator request credentials are sufficient to enable update of the administrator identifier of the proxy administrator contract.

6. The method of any one of embodiments 1-5, further comprising:

sending, by the proxy contract to the implementation contract, a request for execution of the implementation logic; and receiving, by the proxy contract from the implementation contract, an indication that execution of the implementation logic requires administrative privileges, wherein the proxy contract querying the proxy administrator contract to obtain the administrator identifier is conducted responsive to receiving the indication that execution of the implementation logic requires administrative privileges.

7. A system comprising:

a processor; and non-transitory computer readable storage medium comprising program instructions stored thereon that are executable by a processor to cause the following operations for implementing administrative control over executable contracts:

storing, in a proxy administrator contract stored on a distributed ledger, an administrator identifier;

storing, in a proxy contract stored on the distributed ledger:

a proxy administrator contract identifier corresponding to the proxy administrator contract; and an implementation identifier corresponding to an implementation contract stored on the distributed ledger and comprising implementation logic;

receiving, by the proxy contract, an execution request comprising:

a request for execution of a process that relies on execution of the implementation logic of the implementation contract; and execution request credentials comprising a requestor identifier;

querying, by the proxy contract based on the proxy administrator contract identifier, the proxy administrator contract to obtain the administrator identifier;

determining, by the proxy contract, that the requestor identifier corresponds to the administrator identifier; and enabling, based on determining that the requestor identifier corresponds to the administrator identifier, execution of the process using the implementation logic of the implementation contract.

8. The system of embodiment 7, the operations further comprising:

receiving, by the proxy contract, a second execution request comprising:

a second request for execution of a second process that relies on execution of the implementation logic of the implementation contract; and second execution request credentials comprising a second requestor identifier;

querying, by the proxy contract based on the proxy administrator contract identifier, the proxy administrator contract to obtain the administrator identifier;

determining, by the proxy contract, that the second requestor identifier does not correspond to the administrator identifier; and inhibiting, based on determining that the second requestor identifier does not correspond to the administrator identifier, execution of the second process using the implementation logic of the implementation contract.

9. The system of embodiment 7 or 8, the operations further comprising:

receiving, by the proxy administrator contract, an administrator update request comprising:

the administrator identifier; and admin request credentials; and determining that the admin request credentials are sufficient to enable update of the administrator identifier of the proxy administrator contract, wherein the storing of the identifier in the proxy administrator contract is conducted responsive to determining that the admin request credentials are sufficient to enable update of the administrator identifier of the proxy administrator contract.

10. The system of embodiment 9, the operations further comprising:

receiving, by the proxy administrator contract, a second administrator update request comprising:

a second administrator identifier; and second administrator request credentials; and determining that the second administrator request credentials are not sufficient to enable update of the administrator identifier of the proxy administrator contract; and inhibiting storing of the second administrator identifier in the proxy administrator contract responsive to determining that the second administrator request credentials are not sufficient to enable update of the administrator identifier of the proxy administrator contract.

11. The system of any one of embodiments 7-10, the operations further comprising:

receiving, by the proxy administrator contract, an administrator update request comprising:

a second administrator identifier; and second admin request credentials; and determining that the second administrator request credentials are sufficient to enable update of the administrator identifier of the proxy administrator contract; and storing the second administrator identifier in the proxy administrator contract in place of the administrator identifier responsive to determining that the second administrator request credentials are sufficient to enable update of the administrator identifier of the proxy administrator contract.

12. The system of any one of embodiments 7-11, the operations further comprising:

sending, by the proxy contract to the implementation contract, a request for execution of the implementation logic; and receiving, by the proxy contract from the implementation contract, an indication that execution of the implementation logic requires administrative privileges, wherein the proxy contract querying the proxy administrator contract to obtain the administrator identifier is conducted responsive to receiving the indication that execution of the implementation logic requires administrative privileges.

13. A computer-implemented method for implementing administrative control over executable contracts, the method comprising:

receiving, by a proxy contract stored on a distributed ledger, an execution request comprising:

a request for execution of a process that relies on execution of implementation logic of an implementation contract stored on the distributed ledger; and execution request credentials comprising a requestor identifier;

obtaining, by the proxy contract from a proxy administrator contract stored on the distributed ledger, an administrator identifier, the proxy administrator contract storing the administrator identifier;

determining, by the proxy contract, that the requestor identifier corresponds to the administrator identifier; and enabling, based on determining that the requestor identifier corresponds to the administrator identifier, execution of the process using the implementation logic of the implementation contract.

14. Non-transitory computer readable storage medium comprising program instructions stored thereon that are executable by a processor to cause the method of any one of claim 1-6 or 13.

Validated utilization of executable contracts:

1. A computer-implemented method for validated utilization of executable contracts, the method comprising:

storing, in an implementation contract stored on a distributed ledger, implementation validation credentials, the implementation contract comprising executable implementation logic;

querying, by an executable contract stored on the distributed ledger, the implementation contract for a validation status to obtain the validation credentials;

determining, by the executable contract, that the validation credentials are valid; and enabling, by the executable contract based on determining that the validation credentials are valid, utilization of the implementation contract.

2. The method of embodiment 1, further comprising:

receiving, by the executable contract, an execution request that relies on execution of the implementation logic, wherein enabling utilization of the implementation contract comprises sending, by the executable contract to the implementation contract, an implementation execution request.

3. The method of embodiment 1 or 2, wherein enabling utilization of the implementation contract comprises setting the executable contract to reference the implementation contract for execution of the implementation logic.

4. The method of embodiment 3, further comprising:

querying, by the executable contract, a second implementation contract stored on the distributed ledger for a validation status to obtain second validation credentials for the second implementation contract, the second implementation contract comprising second executable implementation logic;

determining, by the executable contract, that the second validation credentials are valid; and upgrading, by the executable contract based on determining that the second validation credentials are valid, the executable contract to reference the second implementation contract for execution of the second implementation logic in place of the reference the implementation contract for execution of the implementation logic.

5. The method of any one of embodiments 1-4, further comprising:

querying, by the executable contract, a second implementation contract stored on the distributed ledger for a validation status to obtain second validation credentials for the second implementation contract, the second implementation contract comprising second executable implementation logic;

determining, by the executable contract, that the second validation credentials are not valid; and inhibiting, by the executable contract based on determining that the second validation credentials are not valid, utilization of the implementation contract.

6. The method of any one of embodiments 1-5, further comprising:

validating, by a validator, the implementation contract; and setting, based on the validating of the implementation contract, the validation credentials of the implementation contract to indicate the validation of the implementation contract.

7. The method of any one of embodiments 1-6, further comprising setting an executable contract identifier of the executable contract to reference the implementation contract.

8. A system comprising:

a processor; and non-transitory computer readable storage medium comprising program instructions stored thereon that are executable by a processor to cause the following operations for validated utilization of executable contracts:

storing, in an implementation contract stored on a distributed ledger, implementation validation credentials, the implementation contract comprising executable implementation logic;

querying, by an executable contract stored on the distributed ledger, the implementation contract for a validation status to obtain the validation credentials;

determining, by the executable contract, that the validation credentials are valid; and enabling, by the executable contract based on determining that the validation credentials are valid, utilization of the implementation contract.

9. The system of embodiment 8, the operations further comprising:

receiving, by the executable contract, an execution request that relies on execution of the implementation logic, wherein enabling utilization of the implementation contract comprises sending, by the executable contract to the implementation contract, an implementation execution request.

10. The system of embodiment 8 or 9, wherein enabling utilization of the implementation contract comprises setting the executable contract to reference the implementation contract for execution of the implementation logic 11. The system of any one of embodiments 8-10, the operations further comprising:

querying, by the executable contract, a second implementation contract stored on the distributed ledger for a validation status to obtain second validation credentials for the second implementation contract, the second implementation contract comprising second executable implementation logic;

determining, by the executable contract, that the second validation credentials are valid; and upgrading, by the executable contract based on determining that the second validation credentials are valid, the executable contract to reference the second implementation contract for execution of the second implementation logic in place of the reference the implementation contract for execution of the implementation logic.

12. The system of any one of embodiments 8-11, the operations further comprising:

querying, by the executable contract, a second implementation contract stored on the distributed ledger for a validation status to obtain second validation credentials for the second implementation contract, the second implementation contract comprising second executable implementation logic;

determining, by the executable contract, that the second validation credentials are not valid; and inhibiting, by the executable contract based on determining that the second validation credentials are not valid, utilization of the implementation contract.

13. The system of any one of embodiments 8-12, the operations further comprising:

validating, by a validator, the implementation contract; and setting, based on the validating of the implementation contract, the validation credentials of the implementation contract to indicate the validation of the implementation contract.

14. The system of any one of embodiments 8-13, the operations further comprising setting an executable contract identifier of the executable contract to reference the implementation contract.

15. A computer-implemented method for validated utilization of executable contracts, the method comprising:

storing, in an implementation contract stored on a distributed ledger, implementation validation credentials, the implementation contract comprising executable implementation logic;

obtaining, from the implementation contract, the validation credentials;

determining that the validation credentials are valid; and enabling, based on determining that the validation credentials are valid, utilization of the implementation contract.

16. Non-transitory computer readable storage medium comprising program instructions stored thereon that are executable by a processor to cause the method of any one of claim 1-7 or 15.

Validated upgrading of executable contracts:

1. A computer-implemented method for validated upgrading of executable contracts, the method comprising:

storing, in an implementation contract stored on a distributed ledger, implementation data, the implementation contract comprising executable implementation logic;

obtaining, by an upgrade validator, the implementation data for the implementation contract;

receiving, by the upgrade validator, a request to update a proxy contract stored on the distributed ledger to store a reference to the implementation contract for execution of the implementation logic in place of a current reference to a current implementation contract stored in the proxy contract;

determining, by the upgrade validator based on the implementation data for the implementation contract, that the implementation contract is (a) compatible with the proxy contract, and (b) a compatible version with the current implementation contract stored in the proxy contract; and upgrading, by the upgrade validator based on determining that the implementation contract is (a) compatible with the proxy contract, and (b) a compatible version with the current implementation contract, the proxy contract to store the reference to the implementation contract in the proxy contract in place of the current reference to the current implementation contract stored.

2. The method of embodiment 1, further comprising:

receiving, by the proxy contract, an execution request that relies on execution of the implementation logic; and sending, by the proxy contract to the implementation contract based on the reference of the proxy contract to the implementation contract for execution of the implementation logic, an implementation execution request.

3. The method of embodiment 1 or 2, further comprising:

receiving, by the upgrade validator, a request to upgrade a proxy contract stored on the distributed ledger to store a reference to a second implementation contract in place of a current reference to a current implementation contract stored in the proxy contract;

determining, by the upgrade validator based on the implementation data for the second implementation contract, that the second implementation contract is (a) not compatible with the proxy contract, or (b) not a compatible version with the current implementation contract stored in the proxy contract; and inhibiting, by the upgrade validator based on determining that the second implementation contract is (a) not compatible with the proxy contract, or (b) not a compatible version with the current implementation contract stored in the proxy contract, upgrading of the proxy contract to store the reference to the second implementation in the proxy contract in place of the current reference to the current implementation contract stored.

4. The method of any one of embodiments 1-3, wherein the implementation data for the implementation contract comprises a contract type and a contract version.

5. The method of any one of embodiments 1-4, wherein the implementation data for the implementation contract comprising validation credentials for the implementation contract, the method further comprising:

determining, by the upgrade validator, that the validation credentials are valid, wherein updating of the proxy contract is conducted further based on determining that the validation credentials are valid.

6. The method of any one of embodiments 1-5, further comprising:

obtaining, by the upgrade validator from the proxy contract, proxy parameters for the proxy contract, wherein the proxy parameters indicate a compatible contract type and a version of the current implementation contract.

7. A system comprising:

a processor; and non-transitory computer readable storage medium comprising program instructions stored thereon that are executable by a processor to cause the following operations for validated upgrading of executable contracts:

storing, in an implementation contract stored on a distributed ledger, implementation data, the implementation contract comprising executable implementation logic;

obtaining, by an upgrade validator, the implementation data for the implementation contract;

receiving, by the upgrade validator, a request to upgrade a proxy contract stored on the distributed ledger to store a reference to the implementation contract for execution of the implementation logic in place of a current reference to a current implementation contract stored in the proxy contract;

determining, by the upgrade validator based on the implementation data for the implementation contract, that the implementation contract is (a) compatible with the proxy contract, and (b) a compatible version with the current implementation contract stored in the proxy contract; and upgrading, by the upgrade validator based on determining that the implementation contract is (a) compatible with the proxy contract, and (b) a compatible version with the current implementation contract, the proxy contract to store the reference to the implementation contract in the proxy contract in place of the current reference to the current implementation contract stored.

8. The system of embodiment 7, the operations further comprising:

receiving, by the proxy contract, an execution request that relies on execution of the implementation logic; and sending, by the proxy contract to the implementation contract based on the reference of the proxy contract to the implementation contract for execution of the implementation logic, an implementation execution request.

9. The system of embodiment 7 or 8, the operations further comprising:

receiving, by the upgrade validator, a request to upgrade a proxy contract stored on the distributed ledger to store a reference to a second implementation contract in place of a current reference to a current implementation contract stored in the proxy contract;

determining, by the upgrade validator based on the implementation data for the second implementation contract, that the second implementation contract is (a) not compatible with the proxy contract, or (b) not a compatible version with the current implementation contract stored in the proxy contract; and inhibiting, by the upgrade validator based on determining that the second implementation contract is (a) not compatible with the proxy contract, or (b) not a compatible version with the current implementation contract stored in the proxy contract, upgrading of the proxy contract to store the reference to the second implementation in the proxy contract in place of the current reference to the current implementation contract stored.

10. The system of any one of embodiments 7-9, wherein the implementation data for the implementation contract comprises a contract type and a contract version.

11. The system of any one of embodiments 7-10, wherein the implementation data for the implementation contract comprising validation credentials for the implementation contract, the operations further comprising:

determining, by the upgrade validator, that the validation credentials are valid, wherein updating of the proxy contract is conducted further based on determining that the validation credentials are valid.

12. The system of any one of embodiments 7-11, the operations further comprising:

obtaining, by the upgrade validator from the proxy contract, proxy parameters for the proxy contract, wherein the proxy parameters indicate a compatible contract type and a version of the current implementation contract.

13. A computer-implemented method for validated upgrading of executable contracts, the method comprising:

receiving, by an upgrade validator, a request to upgrade a proxy contract stored on the distributed ledger to store a reference to an implementation contract stored on a distributed ledger, the implementation contract comprising executable implementation logic and implementation data;

obtaining, by the upgrade validator, the implementation data for the implementation contract;

determining, by the upgrade validator based on the implementation data for the implementation contract, that the implementation contract is compatible with the proxy contract; and upgrading, by the upgrade validator based on determining that the implementation contract is compatible with the proxy contract, the proxy contract to store the reference to the implementation contract in the proxy contract.

14. Non-transitory computer readable storage medium comprising program instructions stored thereon that are executable by a processor to cause the method of any one of claim 1-6 or 13.

What is claimed is:

1. A computer-implemented method for validated upgrading of executable contracts stored on a distributed ledger, the method comprising:

storing, in an implementation contract stored on a distributed ledger, implementation data comprising cryptographic validation credentials for the implementation contract, the implementation contract comprising executable implementation logic;

obtaining, by an upgrade validator, the implementation data from the implementation contract;

receiving, by the upgrade validator, a request to update a proxy contract stored on the distributed ledger to store a reference to the implementation contract for execution of the implementation logic in place of a current reference to a current implementation contract stored in the proxy contract;

performing, by the upgrade validator, a cryptographic credential-verification operation on the cryptographic validation credentials to determine that the cryptographic validation credentials are valid;

determining, by the upgrade validator based on the implementation data for the implementation contract, that the implementation contract is (a) compatible with the proxy contract, and (b) a compatible version with the current implementation contract stored in the proxy contract; and upgrading, by the upgrade validator based on determining that (1) the cryptographic validation credentials for the implementation contract are valid and (2) the implementation contract is (a) compatible with the proxy contract, and (b) a compatible version with the current implementation contract, the proxy contract to store the reference to the implementation contract in the proxy contract in place of the current reference to the current implementation contract stored.

2. The method of claim 1, further comprising:

receiving, by the proxy contract, an execution request that relies on execution of the implementation logic; and sending, by the proxy contract to the implementation contract based on the reference of the proxy contract to the implementation contract for execution of the implementation logic, an implementation execution request.

3. The method of claim 1, further comprising:

receiving, by the upgrade validator, a request to upgrade a proxy contract stored on the distributed ledger to store a reference to a second implementation contract in place of a current reference to a current implementation contract stored in the proxy contract;

determining, by the upgrade validator based on the implementation data for the second implementation contract, that the second implementation contract is (a) not compatible with the proxy contract, or (b) not a compatible version with the current implementation contract stored in the proxy contract; and inhibiting, by the upgrade validator based on determining that the second implementation contract is (a) not compatible with the proxy contract, or (b) not a compatible version with the current implementation contract stored in the proxy contract, upgrading of the proxy contract to store the reference to the second implementation contract in the proxy contract in place of the current reference to the current implementation contract stored.

4. The method of claim 1, wherein the implementation data for the implementation contract comprises a contract type and a contract version.

5. The method of claim 1, further comprising:

obtaining, by the upgrade validator from the proxy contract, proxy parameters for the proxy contract, wherein the proxy parameters indicate a compatible contract type and a version of the current implementation contract.

6. The method of claim 1, wherein the cryptographic validation credentials comprise a digital signature, and wherein the cryptographic credential-verification operation comprises verifying the digital signature using a public key associated with an implementation validator to determine that the cryptographic validation credentials are valid.

7. The method of claim 1, wherein the cryptographic validation credentials comprise a cryptographic hash, and wherein the cryptographic credential-verification operation comprises confirming that the cryptographic hash corresponds to a hash value associated with the executable implementation logic to determine that the cryptographic validation credentials are valid.

8. The method of claim 1, wherein upgrading the proxy contract comprises modifying an implementation-contract identifier stored in proxy data of the proxy contract to replace an identifier of the current implementation contract with an identifier of the implementation contract.

9. A system comprising:

a processor; and non-transitory computer readable storage medium comprising program instructions stored thereon that are executable by a processor to cause the following operations for validated upgrading of executable contracts stored on a distributed ledger:

storing, in an implementation contract stored on a distributed ledger, implementation data comprising a cryptographic validation credentials for the implementation contract, the implementation contract comprising executable implementation logic;

obtaining, by an upgrade validator, the implementation data from the implementation contract;

receiving, by the upgrade validator, a request to upgrade a proxy contract stored on the distributed ledger to store a reference to the implementation contract for execution of the implementation logic in place of a current reference to a current implementation contract stored in the proxy contract;

performing, by the upgrade validator, a cryptographic credential-verification operation on the cryptographic validation credentials to determine that the cryptographic validation credentials are valid;

determining, by the upgrade validator based on the implementation data for the implementation contract, that the implementation contract is (a) compatible with the proxy contract, and (b) a compatible version with the current implementation contract stored in the proxy contract; and upgrading, by the upgrade validator based on determining that (1) the cryptographic v al dation credentials for the implementation contract are valid and (2) the implementation contract is (a) compatible with the proxy contract, and (b) a compatible version with the current implementation contract, the proxy contract to store the reference to the implementation contract in the proxy contract in place of the current reference to the current implementation contract stored.

10. The system of claim 9, the operations further comprising:

receiving, by the proxy contract, an execution request that relies on execution of the implementation logic; and sending, by the proxy contract to the implementation contract based on the reference of the proxy contract to the implementation contract for execution of the implementation logic, an implementation execution request.

11. The system of claim 9, the operations further comprising:

receiving, by the upgrade validator, a request to upgrade a proxy contract stored on the distributed ledger to store a reference to a second implementation contract in place of a current reference to a current implementation contract stored in the proxy contract;

determining, by the upgrade validator based on the implementation data for the second implementation contract, that the second implementation contract is (a) not compatible with the proxy contract, or (b) not a compatible version with the current implementation contract stored in the proxy contract; and inhibiting, by the upgrade validator based on determining that the second implementation contract is (a) not compatible with the proxy contract, or (b) not a compatible version with the current implementation contract stored in the proxy contract, upgrading of the proxy contract to store the reference to the second implementation contract in the proxy contract in place of the current reference to the current implementation contract stored.

12. The system of claim 9, wherein the implementation data for the implementation contract comprises a contract type and a contract version.

13. The system of claim 9, the operations further comprising:

obtaining, by the upgrade validator from the proxy contract, proxy parameters for the proxy contract, wherein the proxy parameters indicate a compatible contract type and a version of the current implementation contract.

14. The system of claim 9, wherein the cryptographic validation credentials comprise a digital signature, and wherein the cryptographic credential-verification operation comprises verifying the digital signature using a public key associated with an implementation validator to determine that the cryptographic validation credentials are valid.

15. The system of claim 9, wherein the cryptographic validation credentials comprise a cryptographic hash, and wherein the cryptographic credential-verification operation comprises confirming that the cryptographic hash corresponds to a hash value associated with the executable implementation logic to determine that the cryptographic validation credentials are valid.

16. The system of claim 9, wherein upgrading the proxy contract comprises modifying an implementation-contract identifier stored in proxy data of the proxy contract to replace an identifier of the current implementation contract with an identifier of the implementation contract.

17. A non-transitory computer readable storage medium comprising program instructions stored thereon that are executable by a processor to cause the following operations for validated upgrading of executable contracts stored on a distributed ledger:

storing, in an implementation contract stored on a distributed ledger, implementation data comprising cryptographic validation credentials for the implementation contract, the implementation contract comprising executable implementation logic;

obtaining, by an upgrade validator, the implementation data from the implementation contract;

receiving, by the upgrade validator, a request to upgrade a proxy contract stored on the distributed ledger to store a reference to the implementation contract for execution of the implementation logic in place of a current reference to a current implementation contract stored in the proxy contract;

performing, by the upgrade validator, a cryptographic credential-verification operation on the cryptographic validation credentials to determine that the cryptographic validation credentials are valid;

determining, by the upgrade validator based on the implementation data for the implementation contract, that the implementation contract is (a) compatible with the proxy contract, and (b) a compatible version with the current implementation contract stored in the proxy contract; and upgrading, by the upgrade validator based on determining that (1) the cryptographic validation credentials for the implementation contract are valid and (2) the implementation contract is (a) compatible with the proxy contract, and (b) a compatible version with the current implementation contract, the proxy contract to store the reference to the implementation contract in the proxy contract in place of the current reference to the current implementation contract stored.

18. The medium of claim 17, the operations further comprising:

receiving, by the proxy contract, an execution request that relies on execution of the implementation logic; and sending, by the proxy contract to the implementation contract based on the reference of the proxy contract to the implementation contract for execution of the implementation logic, an implementation execution request.

19. The medium of claim 17, the operations further comprising:

receiving, by the upgrade validator, a request to update a proxy contract stored on the distributed ledger to store a reference to a second implementation contract in place of a current reference to a current implementation contract stored in the proxy contract;

determining, by the upgrade validator based on the implementation data for the second implementation contract, that the second implementation contract is (a) not compatible with the proxy contract, or (b) not a compatible version with the current implementation contract stored in the proxy contract; and inhibiting, by the upgrade validator based on determining that the second implementation contract is (a) not compatible with the proxy contract, or (b) not a compatible version with the current implementation contract stored in the proxy contract, upgrading of the proxy contract to store the reference to the second implementation contract in the proxy contract in place of the current reference to the current implementation contract stored.

20. The medium of claim 17, wherein the implementation data for the implementation contract comprises a contract type and a contract version.

21. The medium of claim 17, the operations further comprising:

obtaining, by the upgrade validator from the proxy contract, proxy parameters for the proxy contract, wherein the proxy parameters indicate a compatible contract type and a version of the current implementation contract.

22. The medium of claim 17, wherein the cryptographic validation credentials comprise a digital signature, and wherein the cryptographic credential-verification operation comprises verifying the digital signature using a public key associated with an implementation validator to determine that the cryptographic validation credentials are valid.

23. The medium of claim 17, wherein the cryptographic validation credentials comprise a cryptographic hash, and wherein the cryptographic credential-verification operation comprises confirming that the cryptographic hash corresponds to a hash value associated with the executable implementation logic to determine that the cryptographic validation credentials are valid.

24. The medium of claim 17, wherein upgrading the proxy contract comprises modifying an implementation-contract identifier stored in proxy data of the proxy contract to replace an identifier of the current implementation contract with an identifier of the implementation contract.

25. A computer-implemented method for validated upgrading of executable contracts stored on a distributed ledger, the method comprising:

receiving, by an upgrade validator, a request to upgrade a proxy contract stored on a distributed ledger to store a reference to an implementation contract stored on the distributed ledger, the implementation contract comprising executable implementation logic and implementation data comprising cryptographic validation credentials for the implementation contract;

obtaining, by the upgrade validator, the implementation data from the implementation contract;

performing, by the upgrade validator, a cryptographic credential-verification operation on the cryptographic validation credentials to determine that the cryptographic validation credentials are valid;

determining, by the upgrade validator based on the implementation data for the implementation contract, that the implementation contract is compatible with the proxy contract; and upgrading, by the upgrade validator based on determining that the cryptographic validation credentials are valid and that the implementation contract is compatible with the proxy contract, the proxy contract to store the reference to the implementation contract in the proxy contract.

* * * * *